(12) United States Patent
Dahn

(10) Patent No.: US 10,140,360 B2
(45) Date of Patent: Nov. 27, 2018

(54) GRAPHICAL USER INTERFACES FOR INFORMATION RETRIEVAL SYSTEMS

(75) Inventor: Michael Dahn, Farmington, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 963 days.

(21) Appl. No.: 12/319,133

(22) Filed: Dec. 31, 2008

(65) Prior Publication Data

US 2010/0030749 A1 Feb. 4, 2010

Related U.S. Application Data

(60) Provisional application No. 61/009,601, filed on Dec. 31, 2007.

(51) Int. Cl.
*G06F 17/30* (2006.01)

(52) U.S. Cl.
CPC .............. *G06F 17/30637* (2013.01)

(58) Field of Classification Search
USPC ........ 707/706, 705, 732, 723, 722, 999.003, 707/999.001, 770; 715/780, 762, 700
See application file for complete search history.

(56) References Cited

U.S. PATENT DOCUMENTS

| | | | |
|---|---|---|---|
| 5,802,518 A * | 9/1998 | Karaev et al. | |
| 6,473,750 B1 * | 10/2002 | Petculescu et al. | 707/600 |
| 6,711,569 B1 * | 3/2004 | Bushee | |
| 8,347,226 B2 * | 1/2013 | Windl | G06F 3/0482 715/810 |
| 8,543,564 B2 * | 9/2013 | Conrad et al. | 707/708 |
| 2002/0083079 A1 * | 6/2002 | Meier et al. | 707/104.1 |
| 2004/0128270 A1 * | 7/2004 | Bachman et al. | 707/1 |
| 2004/0205635 A1 * | 10/2004 | Pratte | 715/526 |
| 2004/0254939 A1 * | 12/2004 | Dettinger et al. | 707/100 |
| 2005/0010605 A1 * | 1/2005 | Conrad et al. | 707/104.1 |
| 2007/0162422 A1 * | 7/2007 | Djabarov | 707/2 |
| 2008/0055269 A1 * | 3/2008 | Lemay et al. | 345/173 |

FOREIGN PATENT DOCUMENTS

WO    WO-2007079388 A1    7/2007

OTHER PUBLICATIONS

"International Application Serial No. PCT/US2008/014134, Search Report mailed Jun. 9, 2009", 8 pgs.
"International Application Serial No. PCT/US2008/014134, Written Opinion mailed Jun. 9, 2009", 10 pgs.

* cited by examiner

*Primary Examiner* — Jorge A Casanova
(74) *Attorney, Agent, or Firm* — Duncan Galloway Egan Greenwald, PLLC; Kevin T. Duncan

(57) ABSTRACT

The present inventors devised, among other things, an online legal research system with improved user controls. One exemplary system allows users to enter a query in a query input region that automatically expands to accommodate the length of the query field. The exemplary system also responds to the query by automatically directing it to an appropriate database, saving the user from having to choose among the myriad databases within the system. The exemplary system also provides user-specific folders for not only selected documents or excerpts from documents, but also annotating these documents with notes. The system enables the user to determine whether to make the notes private or publicly available.

16 Claims, 19 Drawing Sheets
(15 of 19 Drawing Sheet(s) Filed in Color)

/ 300

Sources
- Dees v. Saban Entertainment
- Morrill v. Smashing Pumpkins

Jurisdiction: California

Issues:
- Implied Copyright License
- 99K48, 99K49, 99K75, 99K88, 99K107

Key Materials
- Key Cases
  - Effects Assoc. v. Cohen
  - Oddo v. Ries
  - Foad Consulting Group v. Azzalino
  - ...
  - A&M Records v. Napster
  - ...

- Key Statutes
  - 17 U.S.C §204: Execution of transfers of copyright ownership
  - 17 U.S.C §101: Definitions
- Key Briefs/Trial Docs
  - 2004 WL 2254503: Marder v Lopes & Sony Music: Appellees Brief
  - 200e WL 22724273: Biatty v Warner Bros: Appellee's Brief
  - ...
- Key Analytical Materials
  - 18 AmJur 2d Copyright & Intellectual Property § 155
  - 52 J. Copyright Soc't USA 403: Selected Law of Copyright Assignments and Licenses
  - ...

Additional Related Materials

GRAPHICAL USER INTERFACES FOR INFORMATION RETRIEVAL SYSTEMS

RELATED APPLICATION

This application claims priority to U.S. Provisional Application 61/009,601, which was filed on Dec. 31, 2007 and which is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2007 Thomson Reuters Global Resources.

TECHNICAL FIELD

Various embodiments of the present invention concern control of online legal research systems using, for example, graphical user interface.

BACKGROUND

The American legal system, as well as some other legal systems around the world, rely on both statutory law and case law (written judicial opinions that interpret statutes and/or articulate uncodified law) to resolve legal disputes. Moreover, the law typically varies based on whether the disputes falls under federal, state, or local jurisdiction. Furthermore, laws change over time. Thus, lawyers are continually called upon to research the law to effectively serve the needs of their clients.

To facilitate their research, many lawyers use online legal research systems, such as the popular Westlaw™ system, as a basic tool. Retrieving information using such systems typically requires users to select one of set of many proprietary databases or information sources and to enter a terms and connectors type query or a natural language query. Specialized search templates for the selected database are sometimes made available to assist the user in formulating the query.

The present inventors recognize that effective use of these system often takes considerable experience and knowledge, given that users typically need some knowledge of which databases to use and how to construct good queries. Indeed, much information that may be useful to a user can easily go overlooked simply because the user was ignorant of where to search. Moreover, the present inventors also recognize that these systems, though quite powerful, lack many control features and conveniences that could make lawyers more effective at their work.

Accordingly, the present inventors have recognized a need for improving online legal research systems.

SUMMARY

To address this and/or other needs, the present inventor devises, among other things, an online legal research system with improved user controls. One exemplary system allows users to enter a query in a query input region that automatically expands to accommodate the length of the query field. The exemplary system also responds to the query by automatically directing it to an appropriate database, saving the user from having to choose among the myriad databases within the system. The exemplary system also provides user-specific folders for not only selected documents or excerpts from documents, but also annotating these documents with notes. The system enables the user to determine whether to make the notes private or publicly available.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1C-1D and 2-31 are facsimiles of exemplary graphical user interfaces corresponding to one or more embodiments of the invention.

DETAILED DESCRIPTION OF EXEMPLARY EMBODIMENT(S)

This description describes one or more specific embodiments of one or more inventions. These embodiments, offered not to limit but only to exemplify and teach the inventive subject matter, are shown and described in sufficient detail to enable those skilled in the art to implement or practice the various embodiments of the invention. Thus, where appropriate to avoid obscuring the invention, the description may omit certain information known to those of skill in the art.

Exemplary Information-Retrieval System

Figure 1A:
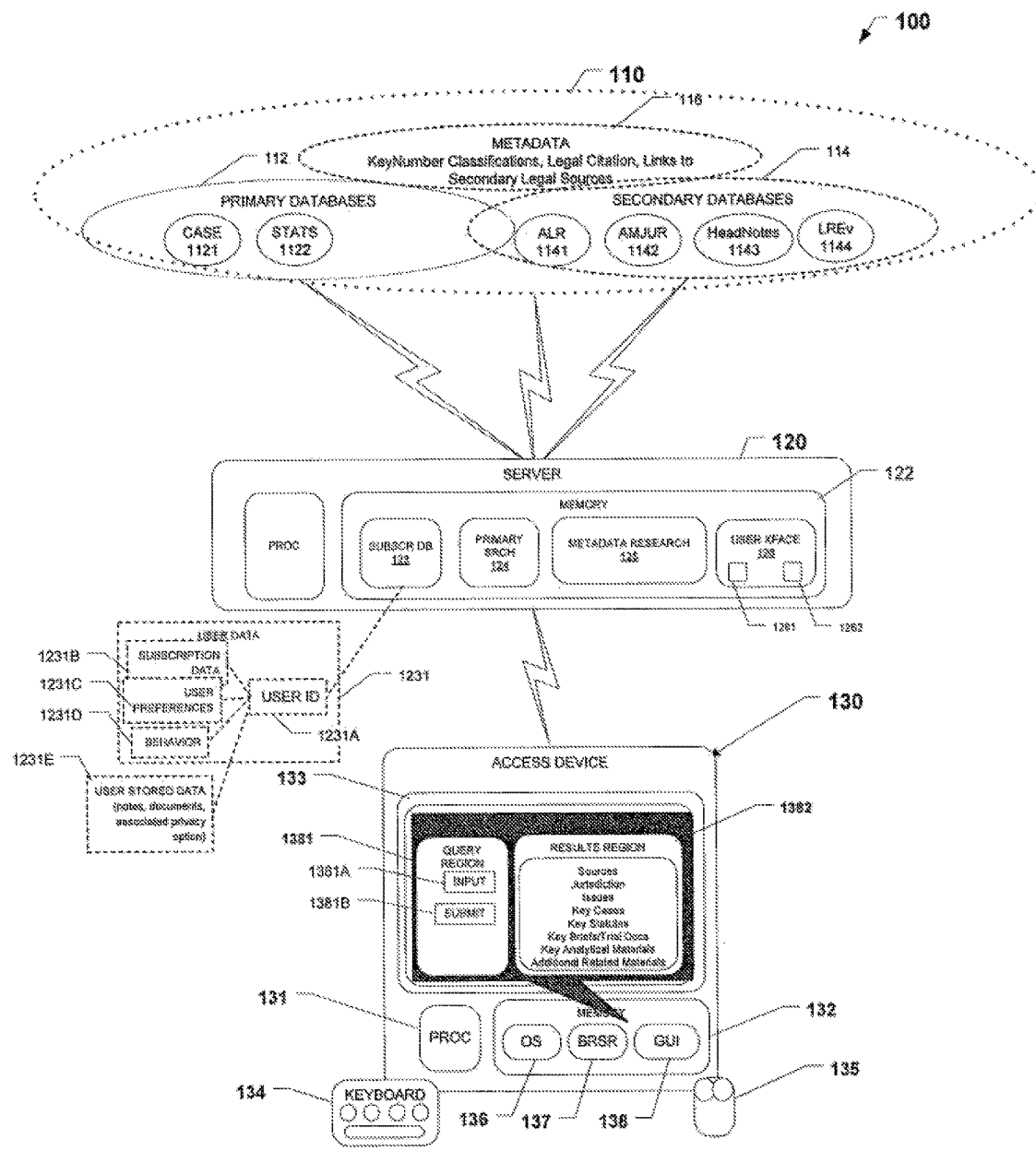
FIG. 1A is a diagram of an exemplary online legal research system 100 corresponding to one or more embodiments of the invention.

FIG. 1A shows an exemplary online information-retrieval (or legal research) system 100. System 100 includes one or more databases 110, one or more servers 120, and one or more access devices 130.

Databases 110 includes a set of primary databases 112, a set of secondary databases 114, and a set of metadata databases 116. Primary databases 112, in the exemplary embodiment, include a caselaw database 1121 and a statutes databases 1122, which respectively include judicial opinions and statutes from one or more local, state, federal, and/or international jurisdictions. Secondary databases 114, which contain legal documents of secondary legal authority or more generally authorities subordinate to those offered by judicial or legislative authority in the primary database, includes an ALR (American Law Reports) database, 1141, an AMJUR database 1142, a West Key Number (KNUM) Classification database 1143, and an law review (LREV) database 1144. Metadata databases 116 includes case law and statutory citation relationships, KeyCite data (depth of treatment data, quotation data, headnote assignment data, and ResultsPlus secondary source recommendation data. Also, in some embodiments, primary and secondary connote the order of presentation of search results and not necessarily the authority or credibility of the search results.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, metadata research module 125, and a user-interface module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, secondary search module 125, and user-interface module 126.

Subscriber database 123 includes subscriber-related data (e.g., user data 1231) for controlling, administering, and managing pay-as-you-go or subscription-based access of databases 110. In the exemplary embodiment, subscriber database 123 includes one or more user preference (or more generally user) data structures 1231C which may be associated with or related to USER ID data 1231A. Subscriber database 123 may also include subscription data 1231B, behavior data 1231D, and/or user stored data 1231E (i.e., notes, documents, associated privacy option) which may also be associated with or related to USER ID 1231A. In the exemplary embodiment, one or more aspects of the user data structure relate to user customization of various search and interface options. To this end, some embodiments include user profile information such jurisdiction of practice, area of practice, and position within a firm.

Primary search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Metadata research module 125 includes one or more search engines for receiving and processing queries against metadata databases 116 and aggregating, scoring, and filtering, recommending, and presenting results. In the exemplary embodiment, module 125 includes one or more feature vector builders and learning machines to implement the functionality described herein. Some embodiments charge a separate or additional fee for accessing documents from the second database.

User-interface module 126 includes machine readable and/or executable instruction sets for wholly or partly defining web-based user interfaces, such as search interface 1261 and results interface 1262, over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A, a query submission button 1381B. Search-results region 1382 is also defined in memory and upon rendering presents a variety of types of information in response to a case law query submitted in region 1381. In the exemplary embodiment, the results region identifies one or more source case law documents (that is, one or good cases, usually no more than five), jurisdictional information, issues information, additional key cases, key statutes, key briefs or trial documents, key analytical materials, and/or additional related materials. (See FIG. 3, which is described below, for a more specific example of a results region.) Each identified document in region 1382 is associated with one or more interactive control features, such as hyperlinks, not shown here. User selection of one or more of these control features results in retrieval and display of at least a portion of the corresponding document within a region of interface 138 (not shown in this figure.) Although FIG. 1D shows query region 1381 and results region 1382 as being simultaneously displayed, some embodiments present them at separate times.

Exemplary Operation

Figure 1B:
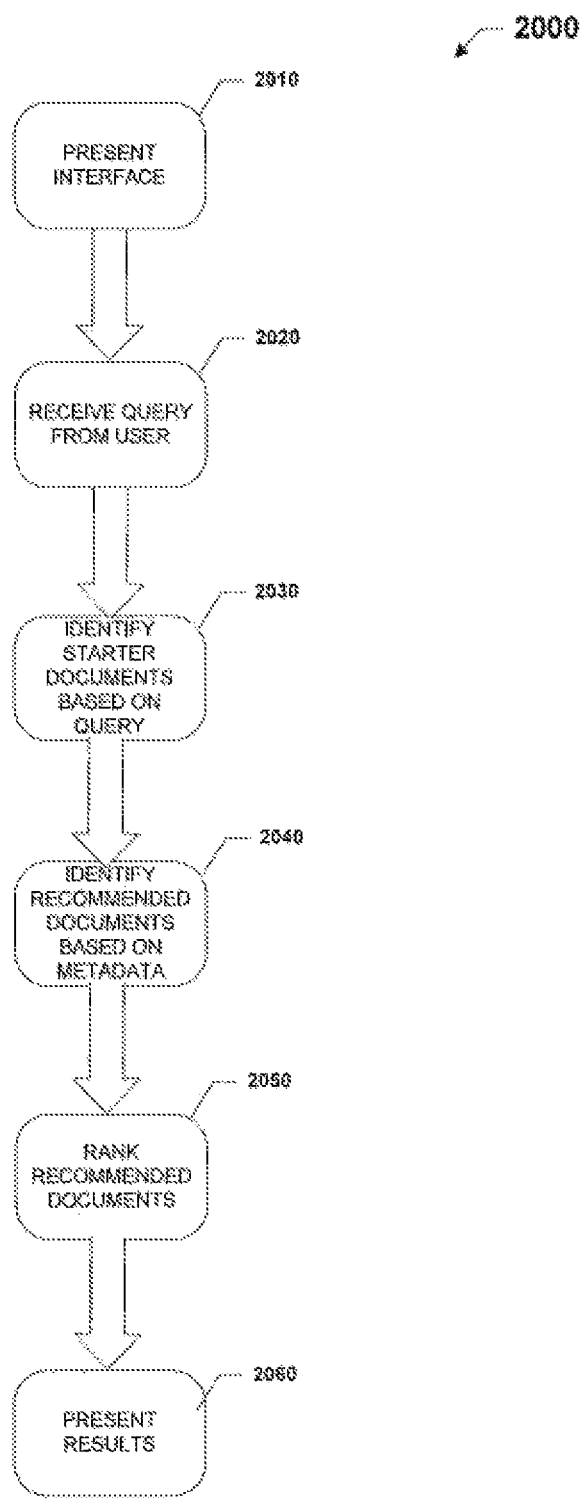
FIG. 1B is a flowchart of an exemplary method of operating system 100, which corresponds to one or more embodiments of the invention.
Figure 1D:
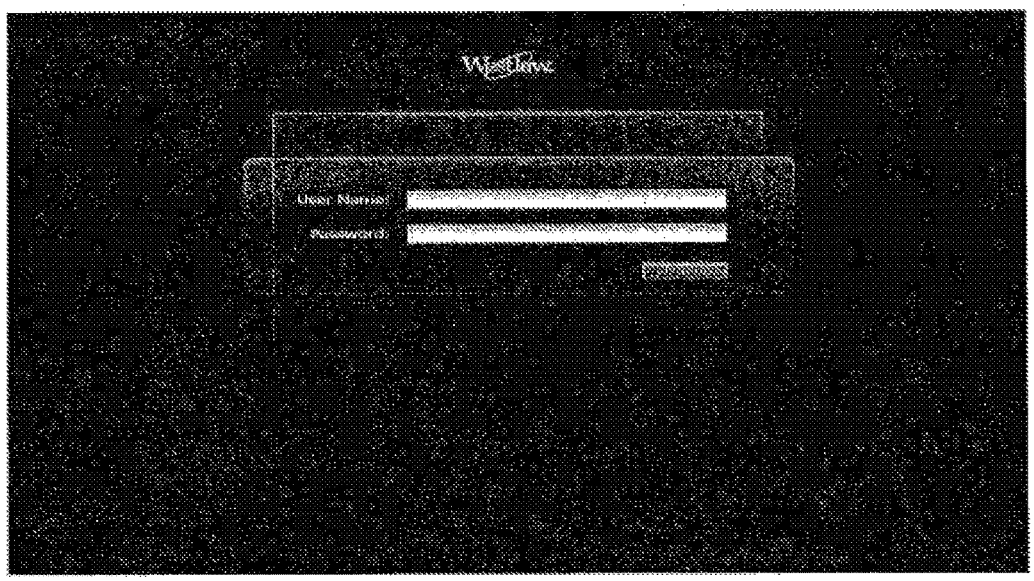

FIG. 1B shows a flow chart 2000 of one or more exemplary methods of operating a system, such as system 100. Flow chart 2000 includes blocks 2010-2060, which, like other blocks in this description, are arranged and described in a serial sequence in the exemplary embodiment. However, some embodiments execute two or more blocks in parallel using multiple processors or processor-like devices or a single processor organized as two or more virtual machines or sub processors. Some embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow (in FIG. 1B and elsewhere in this description) applies to software, hardware, and firmware implementations.

Block 2010 entails presenting a search interface to a user. In the exemplary embodiment, this entails a user directing a browser in an client access device to internet-protocol (IP) address for an online information-retrieval system, such as the Westlaw system and then logging onto the system. Successful login results in a web-based search interface, such as interface 138 in FIG. 1A being output from server 120, stored in memory 132, and displayed by client access device 130.

Using interface 138, the user can define or submit a case law query and cause it to be output to a server, such as server 120. In other embodiments, a query may have been defined or selected by a user to automatically execute on a scheduled or event-driven basis. In these cases, the query may already reside in memory of a server for the information-retrieval system, and thus need not be communicated to the server repeatedly. Execution then advances to block 2020.

Block 2020 entails receipt of a query. In the exemplary embodiment, the query includes a query string and/or a set of target databases (such as jurisdictional and/or subject matter restricted databases), which includes one or more of the select databases. In some embodiments, the query string includes a set of terms and/or connectors, and in other embodiment includes a natural-language string. Also, in some embodiments, the set of target databases is defined automatically or by default based on the form of the system or search interface. Also in some embodiments, the received query may include temporal restrictions defining whether to search secondary resources. In any case, execution continues at block 2030.

Block 2030 entails identifying a starter set of documents based on the received query. In the exemplary embodiment, this entails the server or components under server control or command, executing the query against the primary databases and identifying documents, such as case law documents, that satisfy the query criteria. A number of the starter set of documents, for example 2-5, based on relevance to the query are then selected as starter cases. Execution continues at block 2040.

Block 2040 entails identifying a larger set of recommended cases (documents) based on the starter set of cases. In the exemplary embodiment, this entails searching the metadata databases based on the citations in and to the starter cases, based on secondary legal documents that are associated with the starter cases, legal classes (West KeyNumber classifications) associated with the starter cases, and statutes query to obtain a set of relevant legal classes. In the exemplary embodiment, this larger set of recommended cases, which is identified using metadata research module 126, may include thousands of cases. In some embodiments, the set of recommended cases is based only on metadata associated with the set of starter cases (documents.)

Block 2050 entails ranking the recommended cases. In the exemplary embodiment, this ranking entails defining a feature vector for each of the recommended cases (documents) and using a support vector machine (or more generally a learning machine) to determine a score for each of the documents. The support vector machine may include a linear or nonlinear kernel. Exemplary features for feature vectors include:

NumObservations—how many ways to get from source to recommendation

NumSources—how many sources (starter documents) connect to recommendation

NumReasons—how many kinds of paths to recommendation

MaxQuotations—Maximum of numQuotations value in citations

TFIDFScore—Based on text similarity of text (as used by ResultsPlus (RPD))

RPWeightedScore—Based on number of RPD recommendations shared and their scores

NumSharedRPDocs—Same as RPWeightedScore, but not based on score

KNWeightedScore—Based on the number of key numbers (legal classification codes) shared and their importance NumSharedKeyNumbers—same thing but not based on score NumSourcesCiting—Number of sources that directly cite a recommendation NumCitedSources—Number of sources cited by a recommendation NumCoCitedCases—Number of cases with co-citation between a source and a recommendation NumCoCitedByCases—Number of cases with bibliographic coupling between source and recommended documents NumSharedStatutes—Number of statutes in common SimpleKeyciteCiteCount—Raw Number of times recommended case was cited by any case Some embodiments use all these features, whereas others use various subsets of the features. Execution proceeds to block 2060.

Block 2060 entails presenting search results. In the exemplary embodiment, this entails displaying a listing of one or more of the top ranked recommended case law documents in results region, such as region 1382 in FIG. 1A. In some embodiments, the results may also include one or more non-case law documents that share a metadata relationship with the top-ranked recommended case law documents; legal classification identifiers may also be presented. FIG. 1C shows a detailed example of this type of results presentation. Other embodiments may present a more limited result set including identifiers for the top ranked documents and a set of legal classification codes.

Exemplary Graphical User Interfaces

FIGS. 1-31 show exemplary graphical user interfaces which may be included or substituted for one or more portions of interface 138 in system 100 (in FIG. 1A). In addition to the aesthetics of the interfaces, they each provide user controls and other functionality as described below.

Login/Logoff:

FIG. 1D shows an exemplary login on interface, which includes user name and password fields. The user types in a user name into the user name field and a password (string of numbers and/or letters) that is associated with that user name. The "Sign-On" button is clicked to continue. On any screen in the exemplary embodiment, the user can click on a Sign Off button at the top right to return to the login screen.

Search Box and Pre-Search Filters

Figure 2:
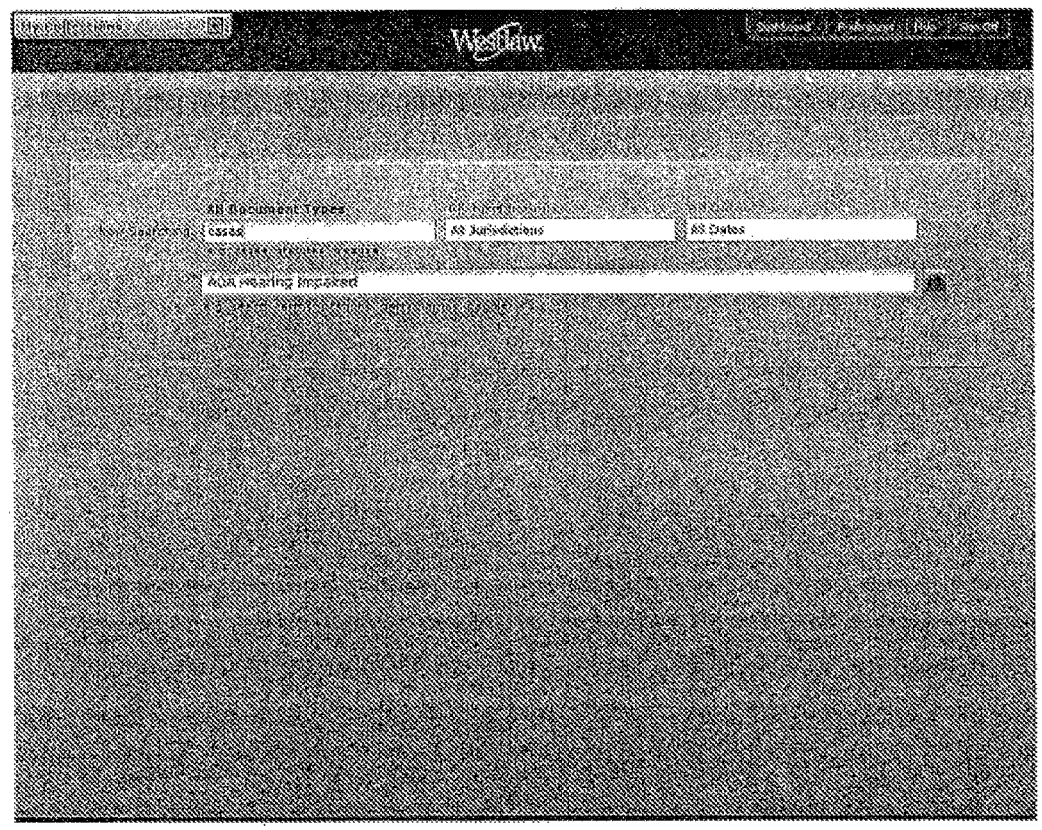

FIG. 2 shows an exemplary search interface which includes a single query input field and pre-search filters for limiting the view of search results based on document type, jurisdiction, and/or date. The user navigates this interface by pressing the TAB key or clicking on the search field or pre-search filters to enter an input. When the user completes entering all the inputs he/she desires, the user clicks on the arrow to submit the query and invoke display of the search results. The single query input box allows users to type any query (i.e. search terms, case citation, party name, etc.) without the need to select a database; the system responds by automatically directing the query to the appropriate databases.

In the exemplary embodiment, the pre-search filter type-in boxes include predictive text functionality that give users the freedom to enter what they already know they are looking for (i.e. a particular jurisdiction) rather than forcing them to search through a long list of databases. Predictive text supports users entering their chosen jurisdictions, documents types, and date. In addition, predictive text in pre-search filter entry, and potentially in search term entry, augments and expands the powerful new search paradigm. In the exemplary embodiment, predictive text functionality takes advantage of user preference or usage habits that are stored in subscriber database 123 of system 100.

Additionally, in the exemplary embodiment the query input field automatically detects when the input text reaches the end of the input box and automatically expands the size of the box by, for example, adding an additional text input line or portion thereof, thus providing a complete view of the input query at all times during entry.

Search Result Interface

Another embodiment of the present invention includes a "Search Results" feature that includes three different modes to view and interact with the search results. The three views support users in finding the document(s) they seek, as well as seeing their query results within the broader context of additional document types and conceptually relevant information. Additional embodiments of the present invention could contain identical content in different presentations or a unique result set related to the user's query.

A number of features support users as they conduct tasks on the "Results Summary" page: a categorized summary of search results gives users quick access to the most relevant documents and provides more detailed information on hover; progressively disclosed, detailed information in-line puts important details at the user's fingertips while avoiding information overload; the Encyclopedia Article Summary provides easy answers to legal questions and gives users quick access to more information without obscuring primary law; easy navigation between three views of a single query result—categorized documents, a results list, and encyclopedia-like articles with quick answers; and global search box enables users to search from any point in their workflow.

Figure 3:
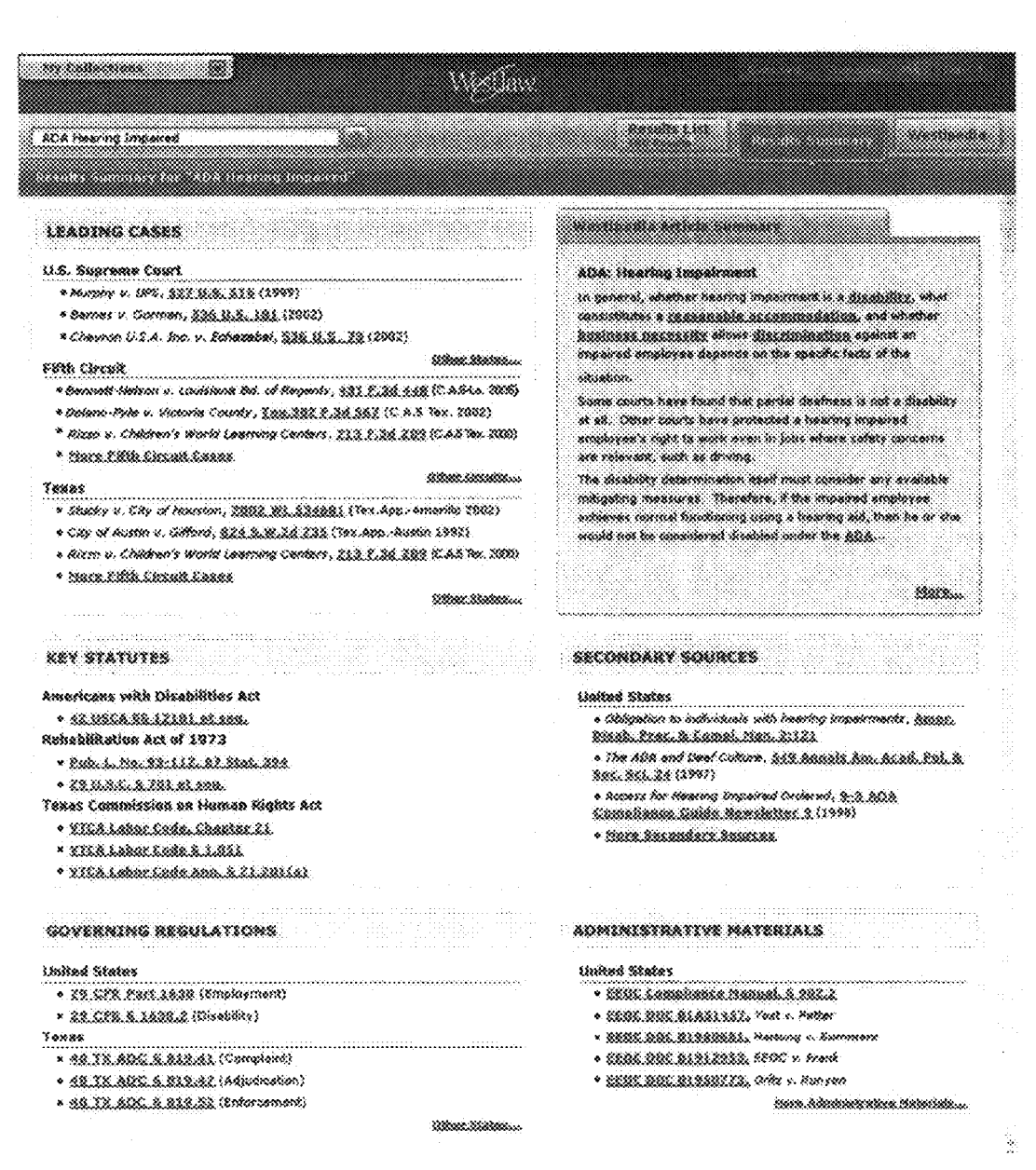

FIG. 3 shows an exemplary "Results Summary" page. The information on this page is presented in sections of related categories such as leading cases, key statutes, secondary sources, encyclopedia, etc, similar to the interface 300 shown in FIG. 1C. Utilized on any page, the user can place and hold the mouse pointer over hyperlink for a predetermined amount of time (e.g. three seconds) to view a callout window with the holding, jurisdiction, and date of the case. In addition, the scroll bar is used to move up and down the page to see all of the Results Summary content. The user can also click on the Encyclopedia button to view the Encyclopedia screen or click on the Results List button to view the Results List screen.

Figure 4:
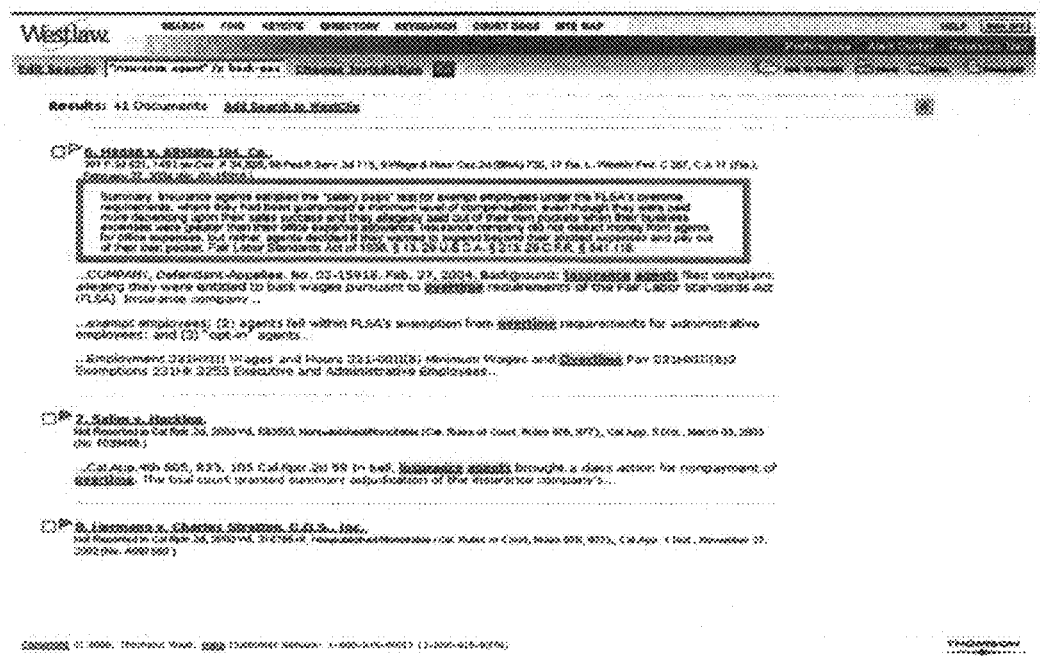
Figure 5:
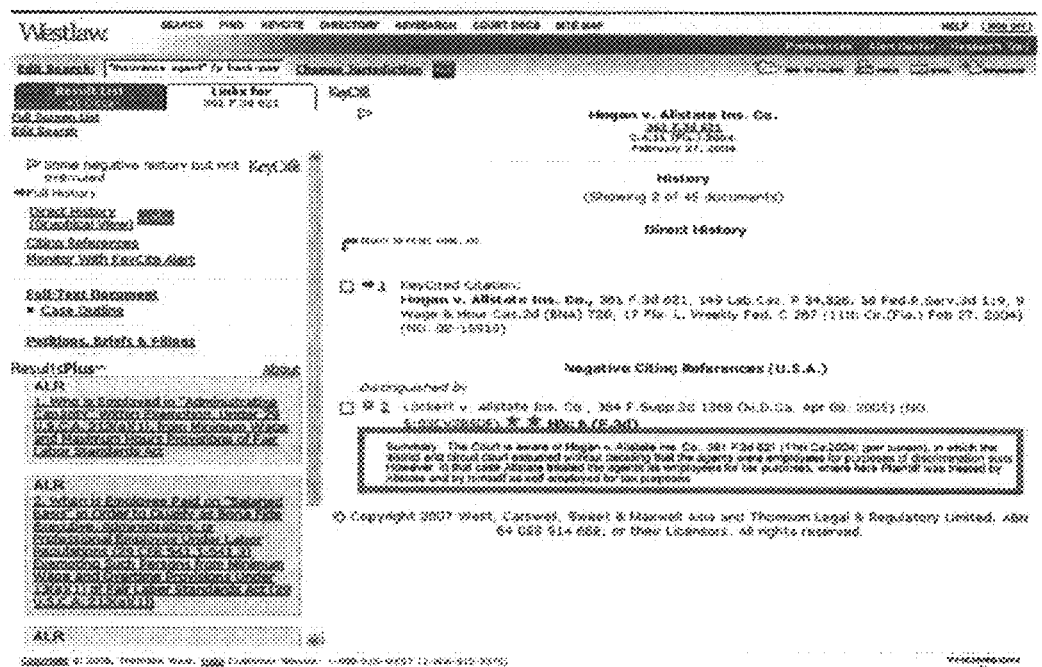
Figure 6:
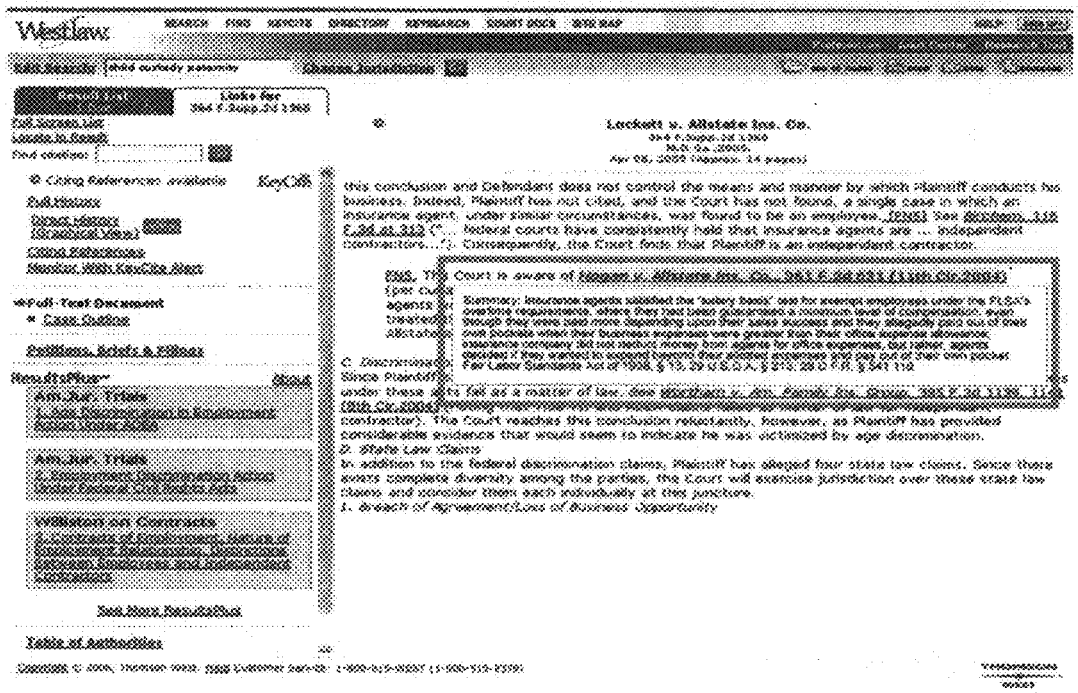

FIGS. 4-6 show exemplary interfaces which allow the user to quickly and effectively determine how relevant a document is for a legal issue through content summaries. The summaries are accessible from a result list, KeyCite Citing References, citations within a document or at the top of documents.

Figure 7:
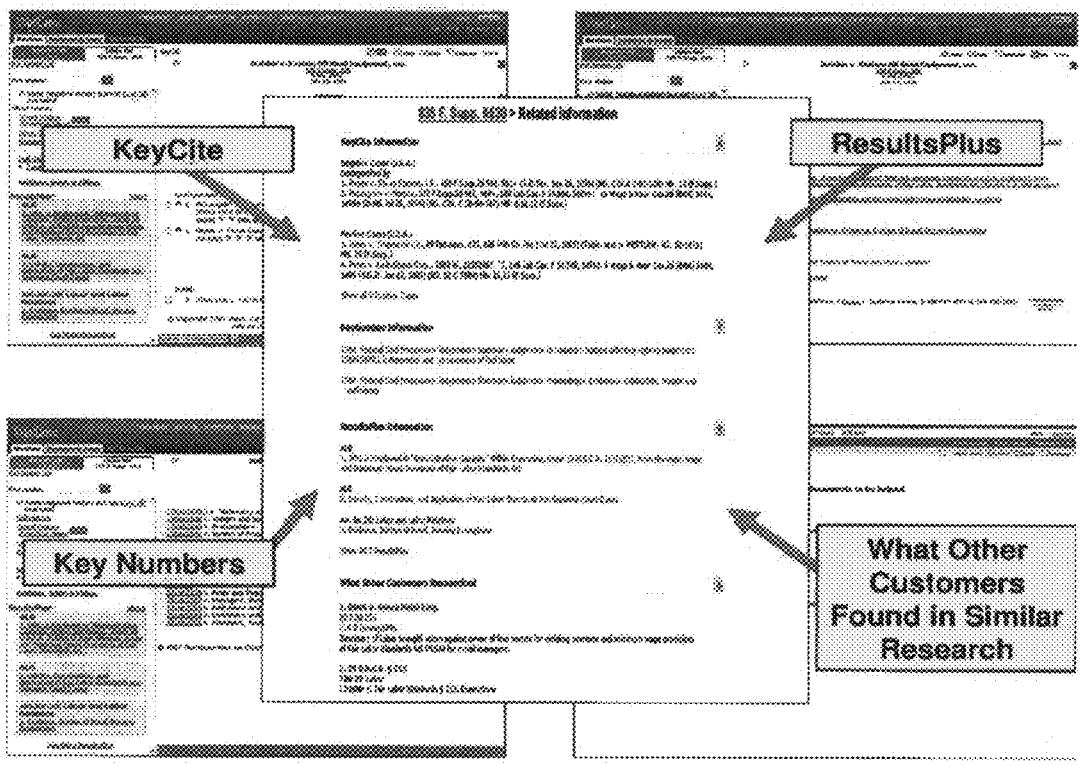
Figure 8:
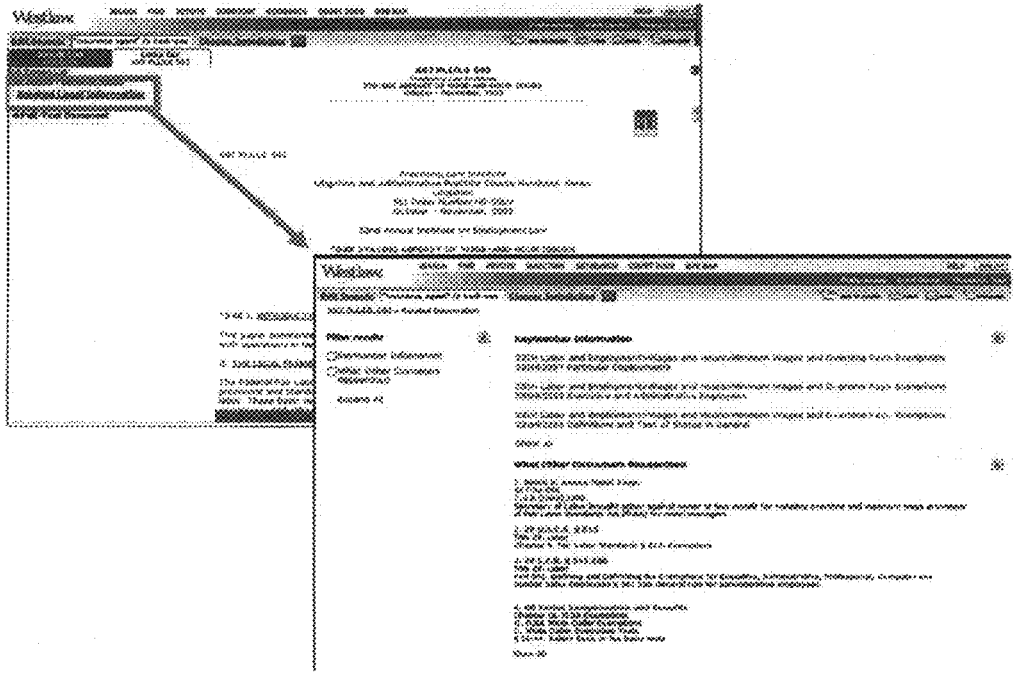

FIGS. 7-8 illustrate interfaces in which information is provided to the user with the most relevant documents for their query, regardless of document type. This embodiment of the present invention provides a one-stop shop for related information for all documents on Westlaw (no need to check multiple sources separately). In addition, a feature "What Other Users Researched" identifies and brings highly related information to the top of the list by combining and analyzing what others researched, KeyCite, ResultsPlus, and the Key Number System.

The "Results List" tab provides users with powerful tools to expand and limit their results list in real time. Users can activate any of four different filter categories—document type, jurisdiction, date, and area of the law—to refine the revealed set of results. The filters collapse into a dashboard state with summary information about the activated items allowing the user to maintain awareness of the selected options without having the filter information compete for attention with the results. A number of features support users as they navigate the "Results List" page: real-time filtering allows users to drill down quickly into a set of results without needing to run a second search; real-time search results filtering also allows users to expand a set of results that they had previously narrowed, giving them easy access to documents they otherwise might have missed; numbers in the filters actively reflect the results set, giving users an understanding of the distribution of results by category; more precise representation of KeyCite flags—Criticized, Weakened, Bad Law—improves understanding of validity information; navigate easily between three views of a single query result—categorized documents, a results list, and encyclopedia-like articles with quick answers; global search box enables users to search from any point in their workflow; simple drag and drop functionality allows users quickly to save and organize documents in personalized collections without interrupting their "find" workflow; and additional filters related to case metadata such as citation frequency, criminal or civil, published or unpublished, and judge.

Figure 9:
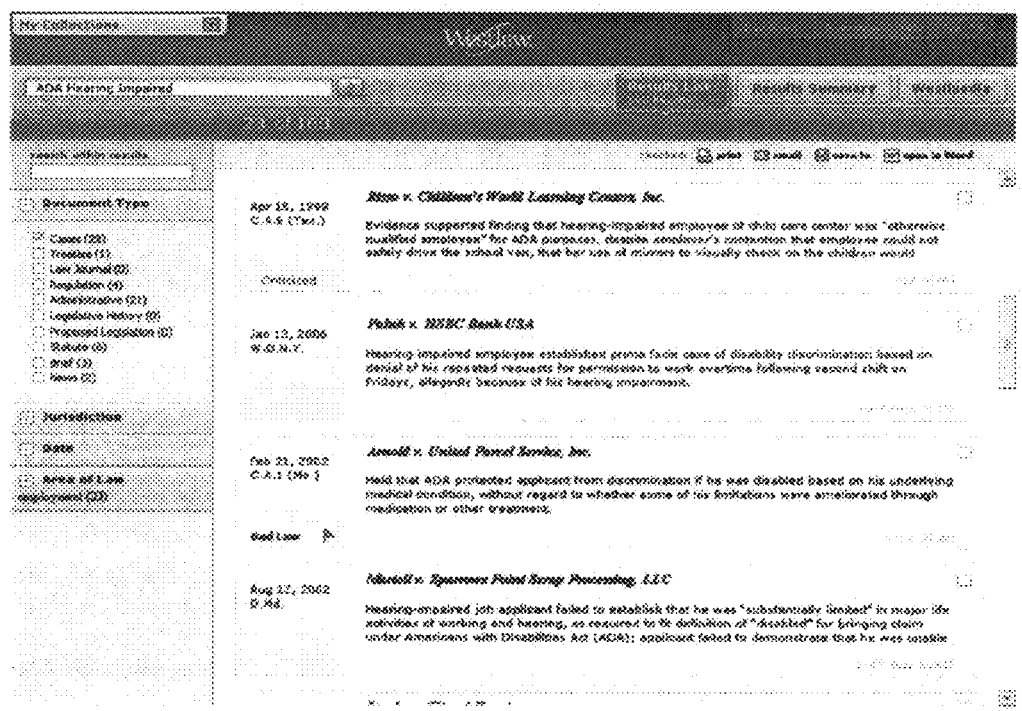

FIG. 9 shows an exemplary Results List interface that is displayed in response to a user selecting the "Results List" page button. As shown, a left pane of this interface includes various filters such as document type, jurisdiction, date, and area of law. In this view, the document type filter is open with cases selected (checked), reflecting pre-query filtering by cases. The user clicks on the checkboxes to add and remove filters and thus changing the result list accordingly. The user can close the document type filter options by clicking on the box immediately to the left of the document type label in the left pane. A case name is hyperlinked so that a user may click the link to go to the Document View screen. The scroll bar is used to move up and down the page to see all of the Results List content.

Figure 10:
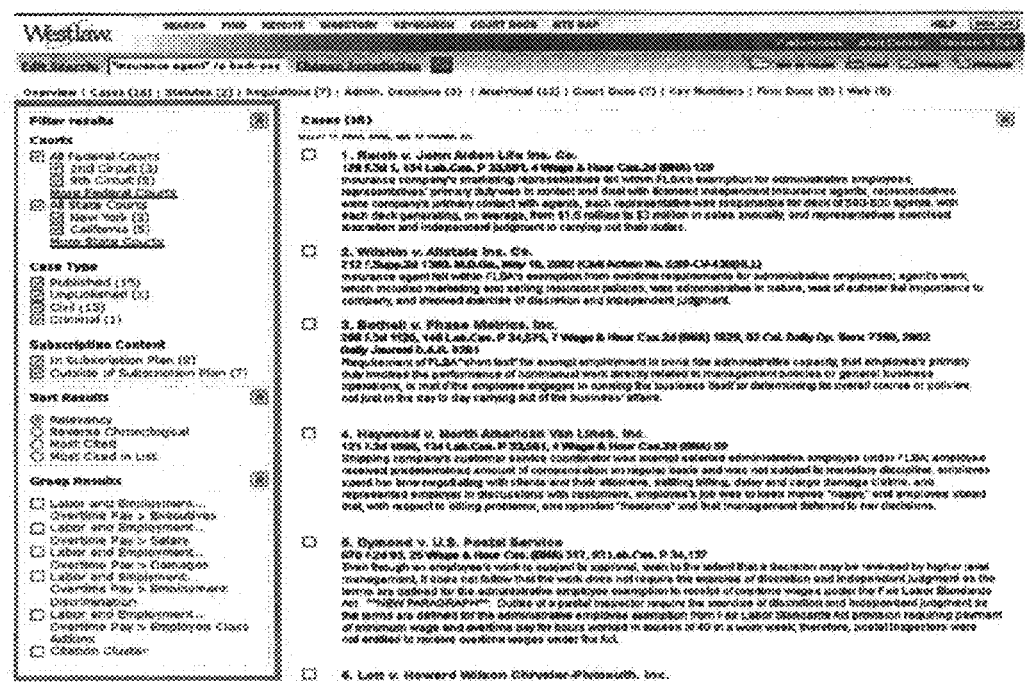

FIG. 10 shows an interface which includes filtering tools to target the documents most relevant to the research—by judge, specific court, etc. Other embodiments of the present invention include grouping search results by legal topic or citation patterns which isolates the documents most relevant to the legal issues, allowing the user to customize the search results, and providing new ways to view relationships between documents and particular legal issues. Additionally, the Figure shows that the user can filter results to include or exclude content based on whether it is within or without their subscription plan.

Figure 11:
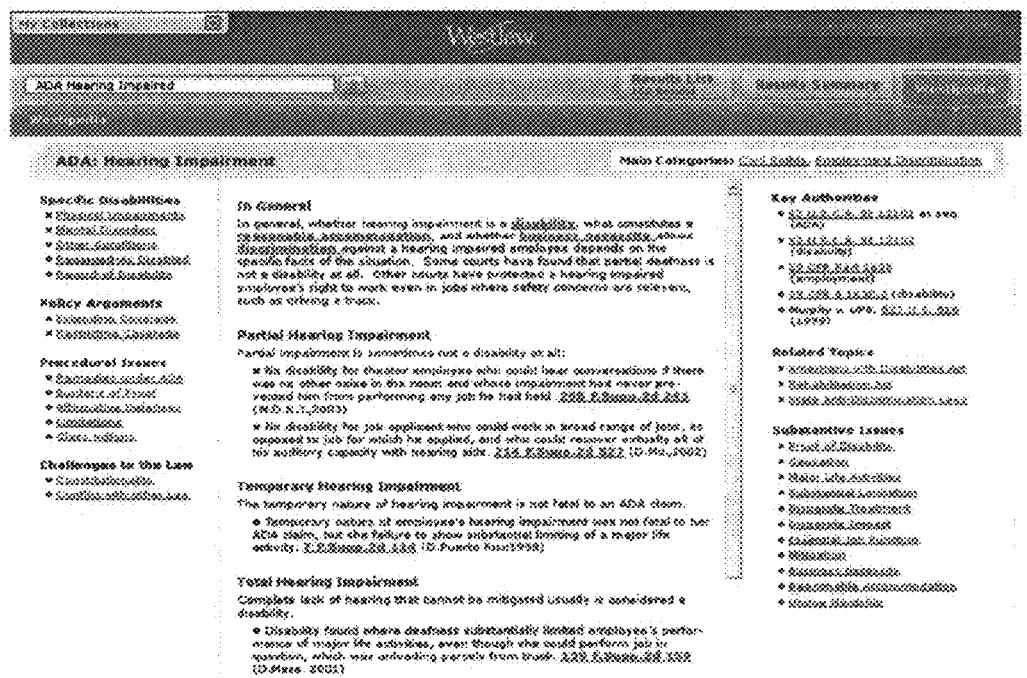

FIG. 11 illustrates an interface of an "Encyclopedia" page that provides encyclopedia-like, easy answers to legal questions that could save hours of pouring over primary law and secondary sources. The entries provide concise answers to simple questions, with links to related resources, contextualized primary law, and additional encyclopedia entries within its content hierarchy.

Document View Interface

The exemplary embodiment includes a document view interface for cases which prominently display a validity flag, which offers more detailed validity information in-line, and which highlights bad or invalid law in a way that gives users the information they need to determine the validity of a case. Editorial content, such as headnotes, is separate from court language, making both the case and headnotes easier to read and giving the case the feel of a legal document. Overruled language within a case is indicated with red brackets and a red flag, making it easier to determine which parts of the case are bad law (and which parts are still good law.) Iconic, graphical representations of citing references give an at-a-glance understanding of a document's history and validity. KeyCite information for Headnotes is leveraged to show which Headnotes are most frequently cited. Key Numbers for Headnotes are displayed in the condensed Reporter format and reveal more details in a callout window. Citation by Jurisdiction and Date (i.e., the map view) overlays the number of citations over a jurisdictional area, allowing users to see where and when cases are frequently cited. The user can also select and drag text clippings from the document into My Collections to save for later viewing. Prominent display of validity flag information with descriptive text and quick access to more detailed information in-line puts important details at the user's fingertips while avoiding information overload. Callout window provides easy answers to the question of validity, enabling the user to determine if the law they are interested in within the case is still valid. In addition, a feature allows users to highlight and annotate documents in-line.

Figure 12:
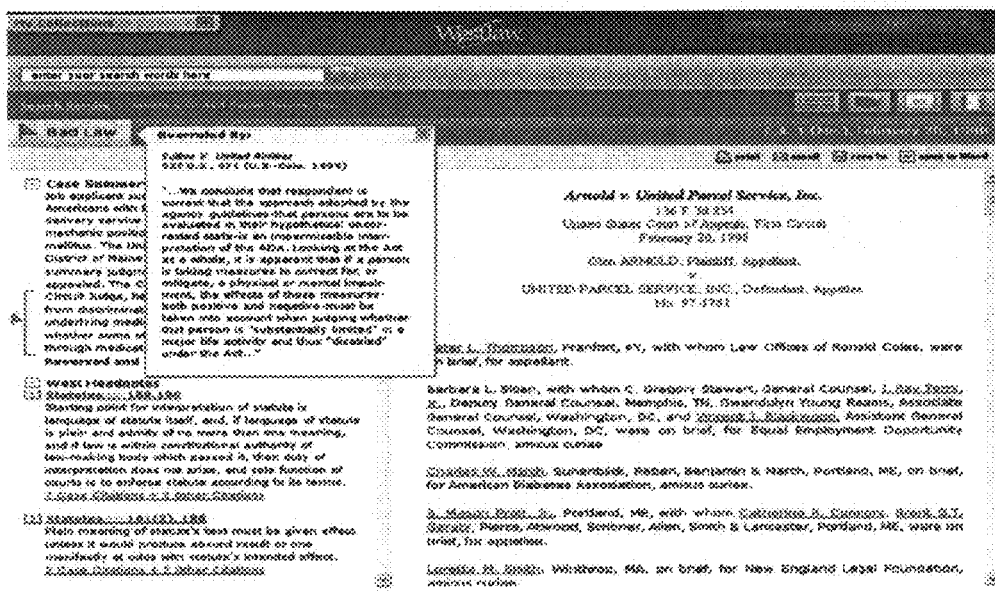

FIG. 12 illustrates an interface in which a user views the validity flag indicator and colored brackets, for example, overruled text in red brackets with red flags for discussion of highlighting bad law within a document. The user can access the Citations Graphical icon, fourth from the left, or Direct History Graphical icon, third from the left, to see the full display. The user clicks on the validity flag indicator to view more information in a callout window and may further click on the case citation to open the document view of the case. To close the callout window, click on the (X) close button.

Figure 13:
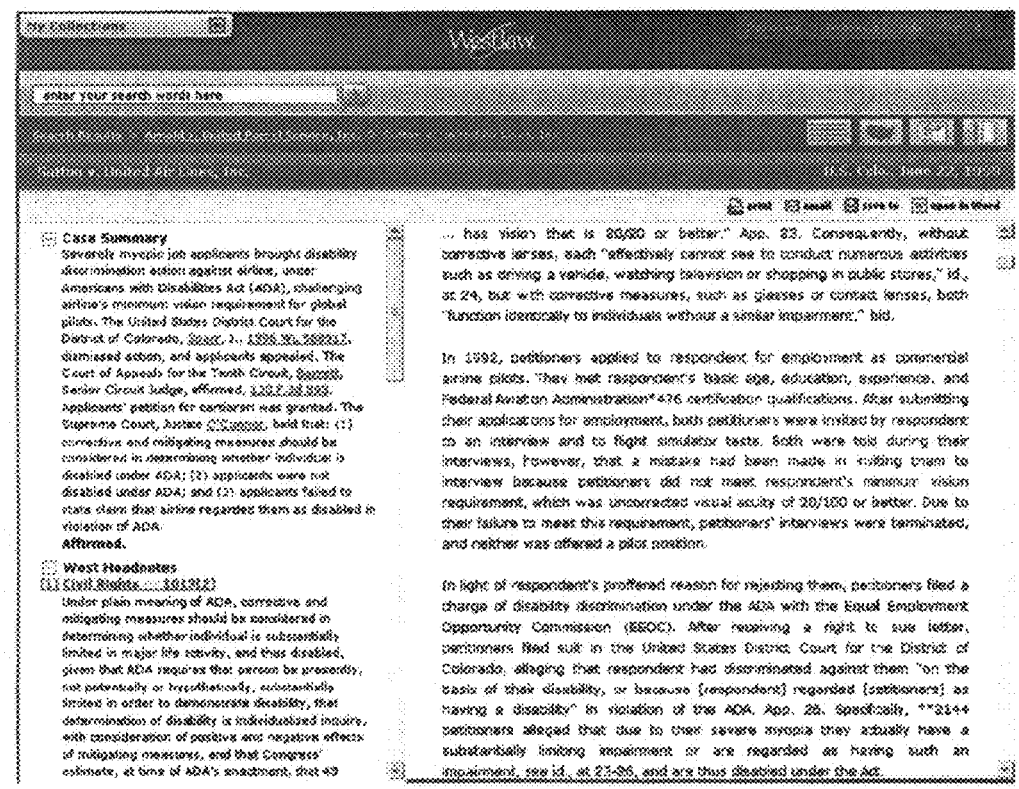

FIG. 13 shows another interface of an embodiment of the present invention. The user selects lines of text that do not include links from anywhere in the document, clicks on the selected text and drags the clipping to My Collections. Click on the case link in the breadcrumb trail to return to that case's document view or click on Search Results link in the breadcrumb trail to go to the Results List screen.

Figure 14:
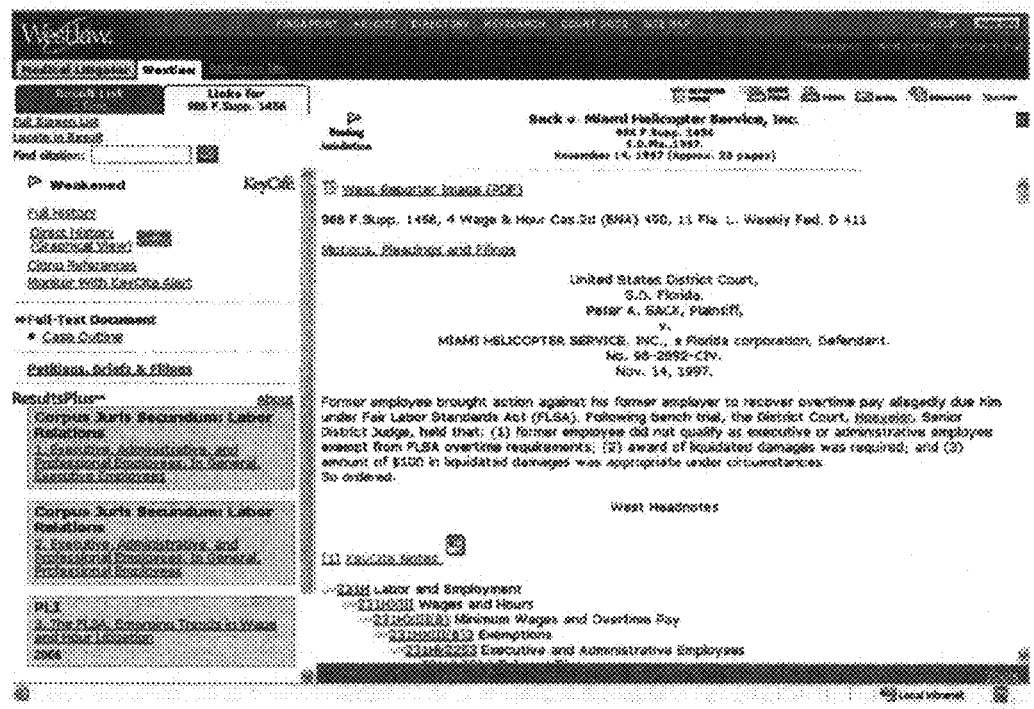
Figure 15:
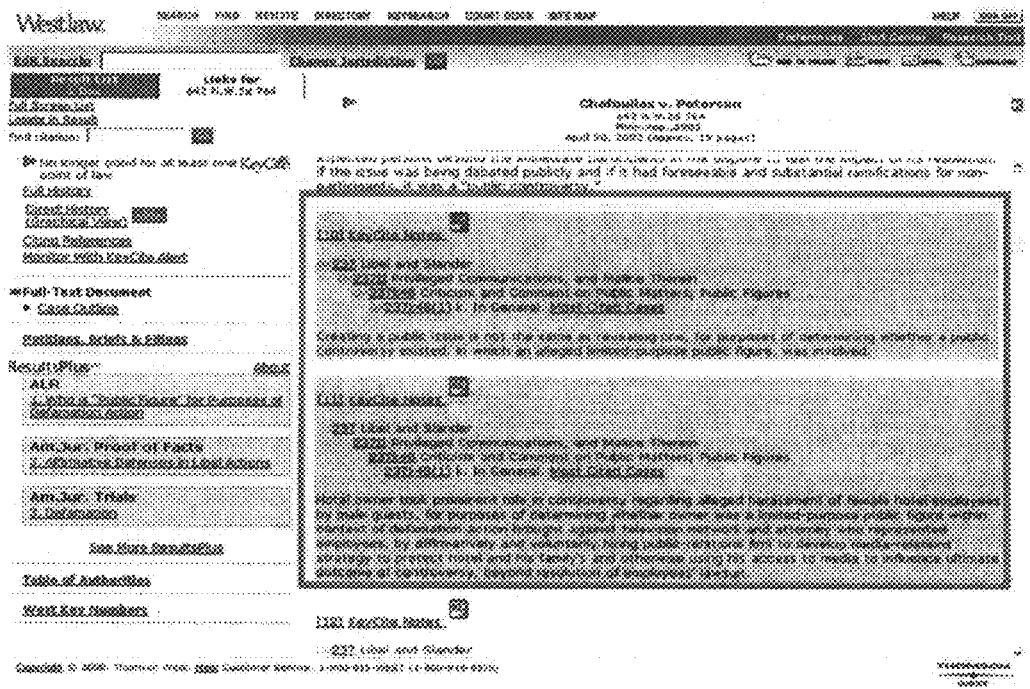
Figure 16:
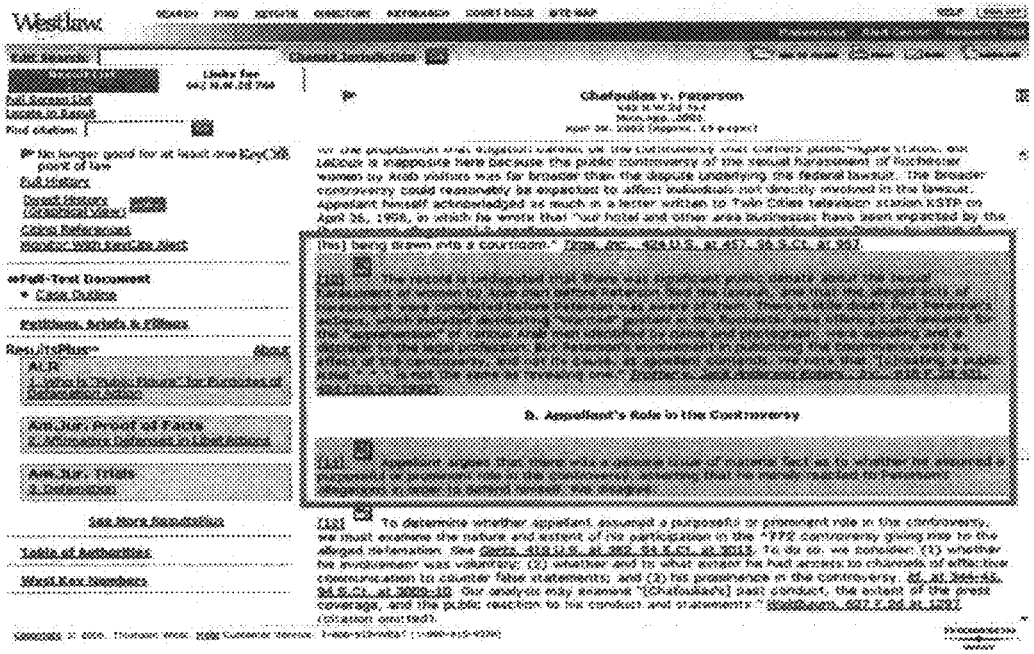

Currently Yellow Flags are split into two categories—those that weaken the current law in the jurisdiction and those that merely criticize it. FIGS. 14-16 illustrate various interfaces that notify the user, through the use of KeyCite flags, where the weakness or overruled points of law are located within the case. The valid holdings from cases that are only partially invalidated are clearly identified.

Graphical View Interfaces

Leveraging current Westlaw functionality, a case's Direct Graphical History is presented in icon-form, allowing users quickly to get a sense of the case's history without opening the full view. Icon view of current Westlaw Direct Graphical History indicates the existence of case history, replacing and extending the functionality of blue KeyCite H's. A new graphical representation of citations provides a quick sense of validity at a glance by showing the distribution of citing references by number, depth of treatment, nature of treatment, and jurisdiction. Progressively disclosed, detailed information allows users to choose when they want to see more information, thereby avoiding information overload. Four simple categories describe the nature of treatment for citing references-positive, criticized, weakened, bad law—while court language descriptions (e.g. "abrogated by") are reserved for use in the callout window. By simplifying the initial presentation of information, the system appears more accurate and factual. Icon view of Citations Graphical indicates at quick glance the existence of case citations, replacing and extending the functionality of green KeyCite C's.

Figure 17:
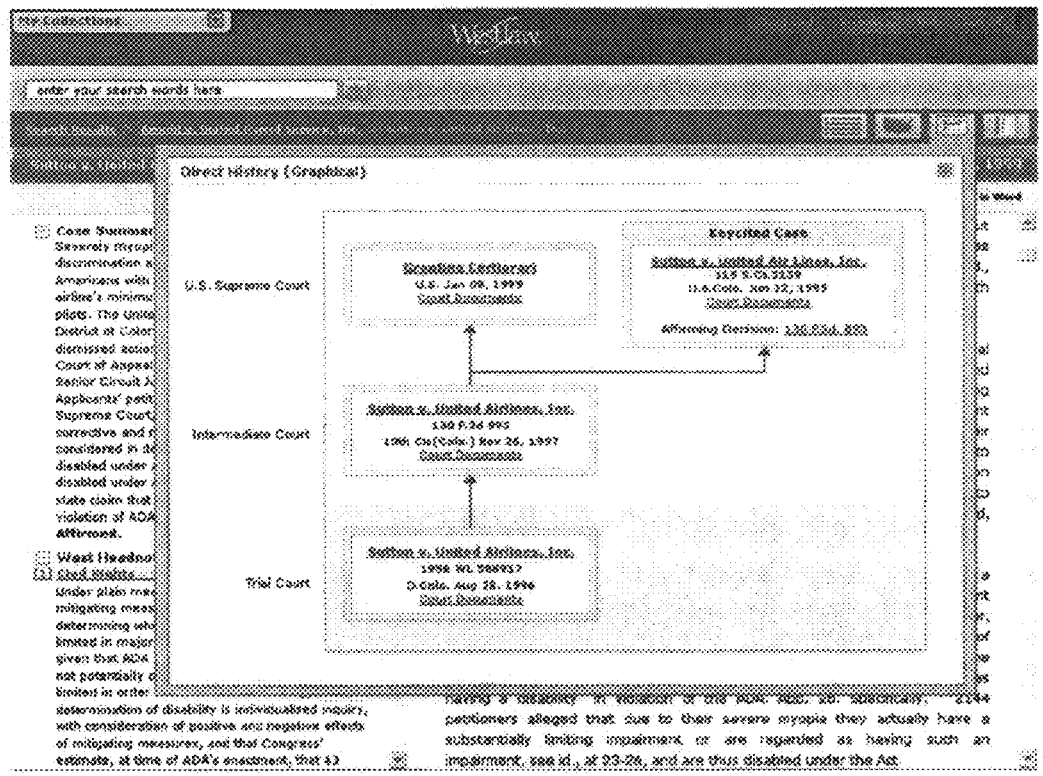
Figure 18:
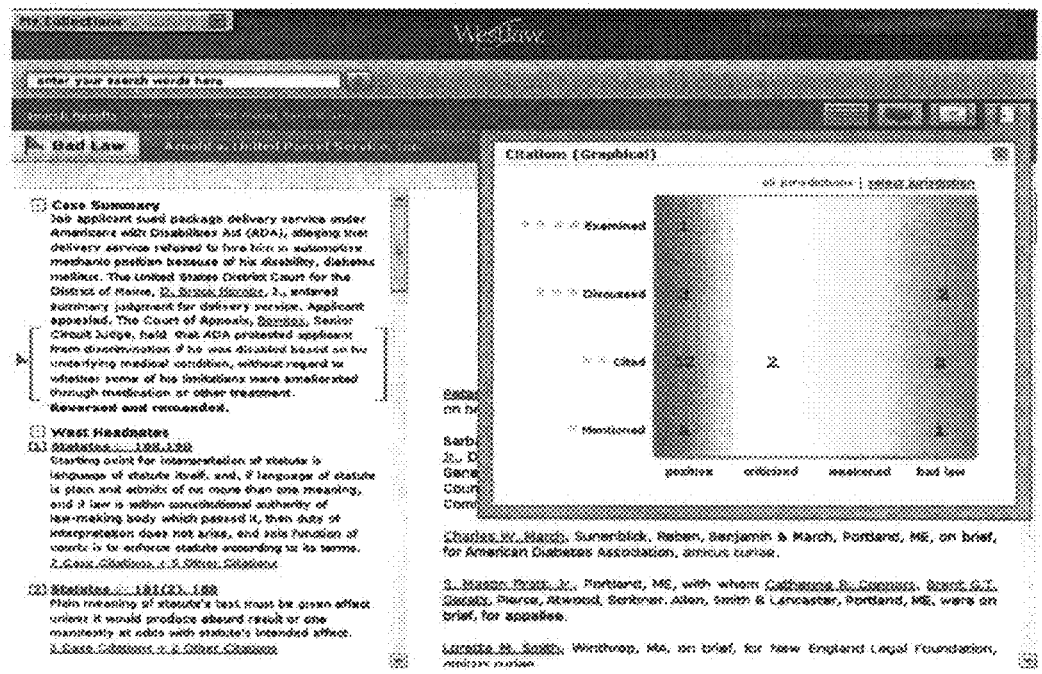

FIGS. 17-18 illustrate interfaces in which the user can visualize a case's history or citation graphically. A user can click on the Direct History Graphical icon to open the full view or click on the Citations Graphical icon to close the Direct History Graphical full view and open the Citations Graphical full view. In the discussed, positive treatment region or cell, click on the numbered link, for example 3, to view detailed information on the three citing cases in a callout window. In the discussed, bad law treatment region or cell, click on the numbered link, for example 2, to view detailed information on the two citing cases in a callout window. To close the pull-down and callout windows, click on the (X) close button. Additionally, the "select jurisdiction" feature allows one to filter the results displayed in the view to specific jurisdictions of interest. In some embodiments, this filter can be a negative filter, allowing the user to select one or more jurisdictions to omit from the displayed results.

My Collections Interfaces

One or more of the exemplary interfaces include a My Collections area, which lets users collect, organize, and annotate materials from Westlaw via a drag-and-drop mechanism. In addition to storing documents, users may also perform Share actions such as printing, emailing, and downloading on items they have gathered. The Collections area synthesizes a lot of information into manageable chunks and allows users to work quite closely with others. Other embodiments of the present invention include fleshing out the collections concept in order to implement document management best practices for activities such as moving items between collections, searching within collections, creating new collections and, possibly, nested collections. Another embodiment of the present invention includes collecting throughout the application and allows users to add materials from outside the information retrieval system to the Collections.

A ubiquitous collections module allows users to save and organize documents and text clippings from anywhere in Westlaw. Simple drag and drop functionality allows the user to quickly save and organize documents in personalized collections. Select and drag text clippings from the document into collections to save for later viewing and assist in argument drafting. Inline note-taking on saved documents helps users manage their collections and eases the transition between "find," "store," and "draft" user states. Original search information is stored with (logically associated with) saved documents allowing users to retrace their research path and determine whether they should re-run their search to view newly added documents. Document recommendations based on the items in the collections help provide interesting materials that might otherwise have been missed. Additionally, some embodiments include alert functionality keyed to content within their collections. Thus, for example, if a new case issues that negatively treats a case or portion thereof stored in a user collection, the item in the user collection is flagged with an appropriate warning, for example, a KeyCite red or yellow flag. Additionally, the my collections access point may be generally flagged to alert the user that some portion of the collections content has been flagged.

Figure 19:
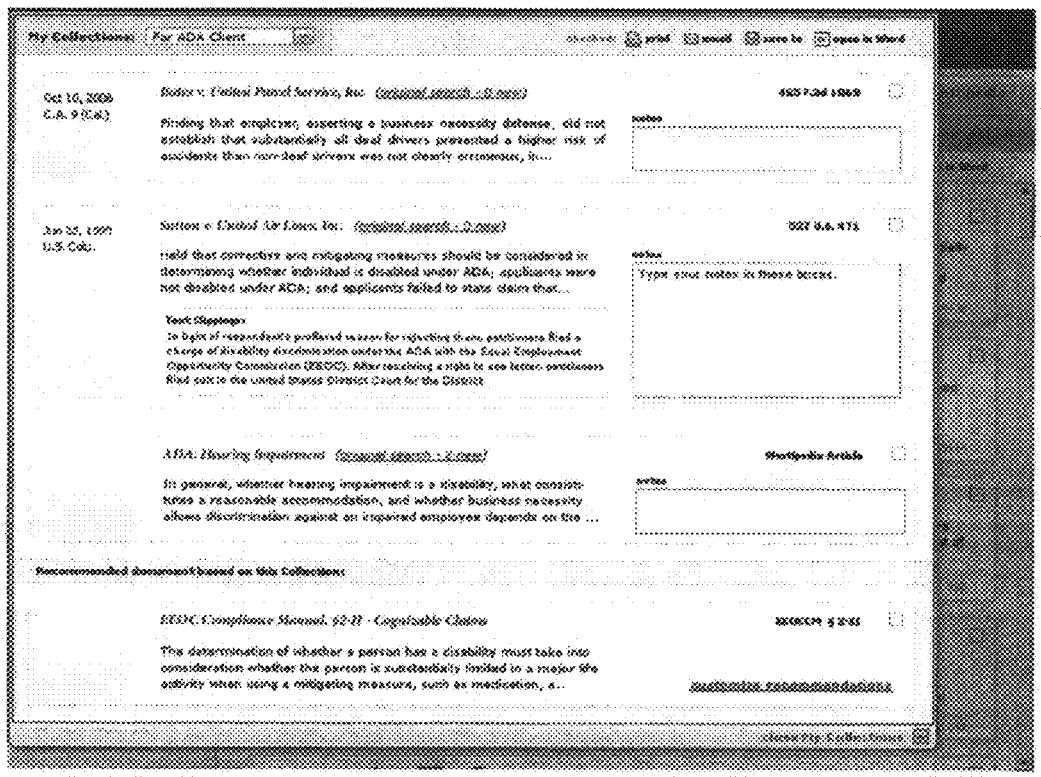

FIG. 19 shows an interface in which a user can create and share comments. The user clicks inside any notes box, and types freely. In this example, on the ADA: Hearing Impairment collected document, move the mouse pointer over the yellow metadata drag area which turns blue to indicate that it can be repositioned. Then click on the drag area and drag the document to the top of the list above Bates v. UPS. The top two documents slide down and the ADA: Hearing Impairment document appears at the top of the list. Clicking on the up arrow at the bottom right closes the My Collections window.

Figure 20:
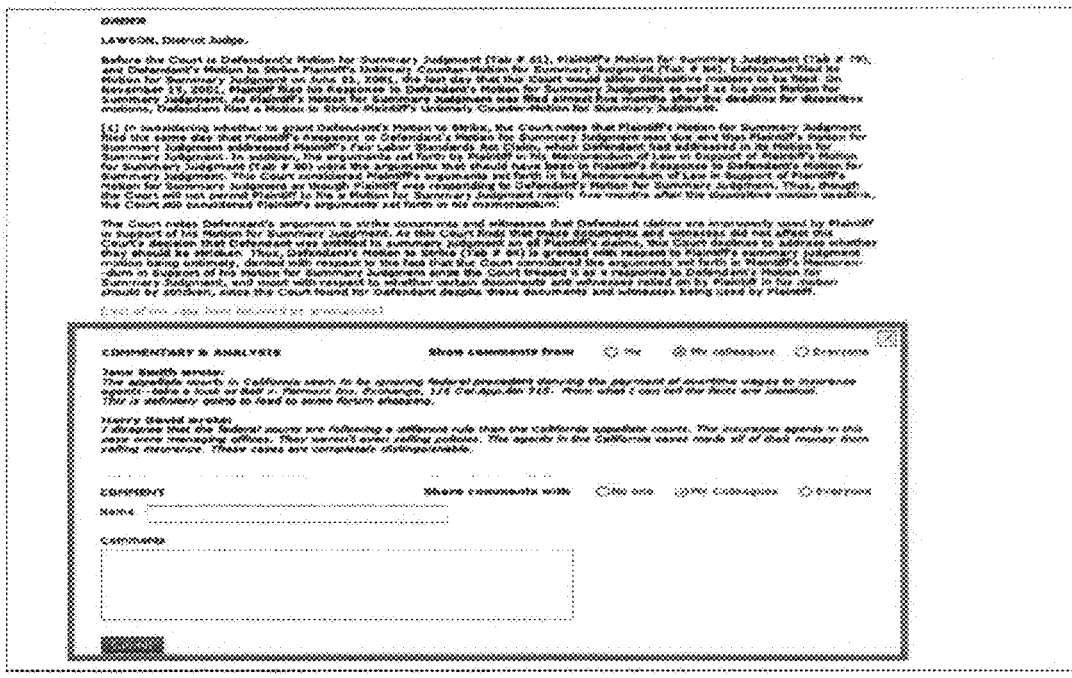

FIG. 20 shows an interface where a user can highlight and make notes on documents and save them in association with his subscriber information for subsequent access. These notes are easily viewed or printed. The user can print documents with comments and highlighting turned on or off. Comments and annotations can be made private to the user, private to the firm, or public to all Westlaw users. This interface of an embodiment of the present invention is a quick and easy way to share thoughts, perspectives, and experience with others and to gain insight from others who have read and analyzed various documents.

Simple drag and drop functionality allows users to save and organize documents quickly in personalized collections without interrupting their "find" workflow. Collected documents have a different appearance so users know which documents they have already saved, even in subsequent searches. Users can create multiple collections, making organization of important documents easier. Integrating document management into Westlaw gives users a single place for conducting legal research, providing a smooth transition between the "find," "store" and "draft" user states.

Figure 21:

FIG. 21 shows an interface which allows the user to locate the case he/she wants to place into My Collections. The user moves the mouse pointer over the yellow metadata drag area which turns blue to indicate that it can be dragged to collections. The user then clicks on the drag area to open the My Collection widget and drags the document to the user-selected collection. The number of documents in the collection increase by 1, the dragged result remains blue to indicate that it has been saved, and the My Collections widget closes. The user can click on the My Collections title bar to open the My Collections widget. Furthermore, the user can click on the user-selected collection to open the full view of My Collections.

Figure 22:
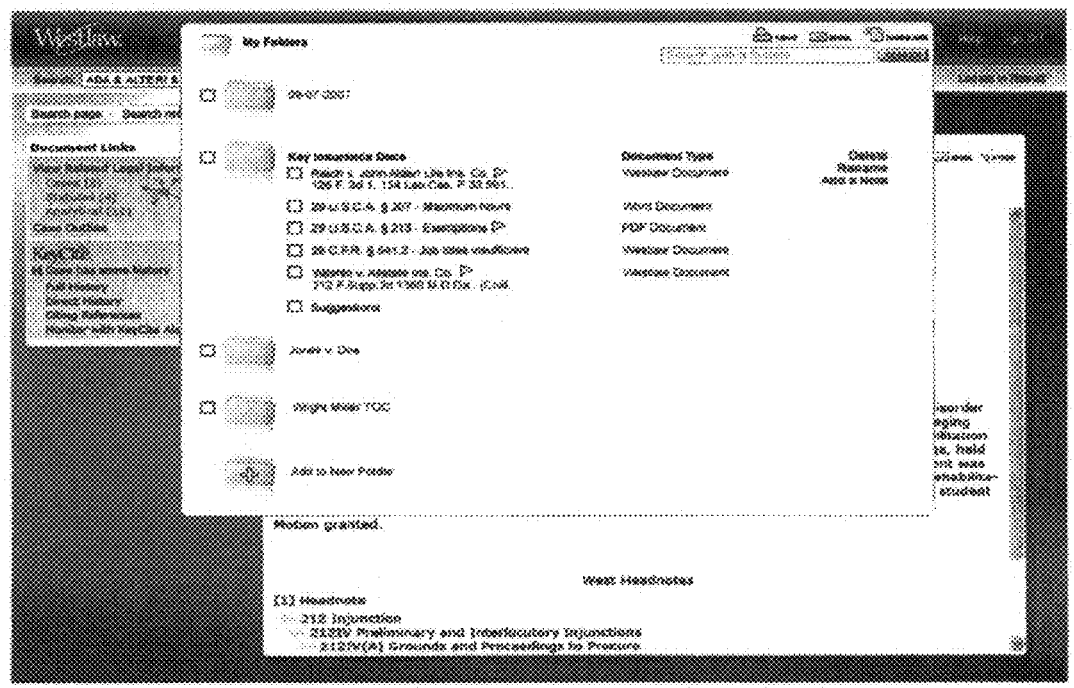

FIG. 22 illustrates interfaces of folders that allow users to organize research based on legal issue, client matter or other topic. Folders allow users to save (indefinitely) documents, parts of documents, search results, and KeyCite results. Folders can be used as a shopping cart for printing and downloading—just drag the items into a folder and then print the research at the end of the session. Folders can be updated based on new legal information that has arisen since the newest item in the folder. Folders can be shared and emailed to colleagues or archived on the user's computer. In some embodiments, folders are organized underneath the user's collection. Notably, the exemplary embodiment also enables uses to select one or more folders using for example a check box and direct specific searches to these folders. Generally, items that included in folders or my collection are also flagged within search results that stem from searches initiated within the legal research interface.

Additional Features, Services, and Displays

Figure 23:
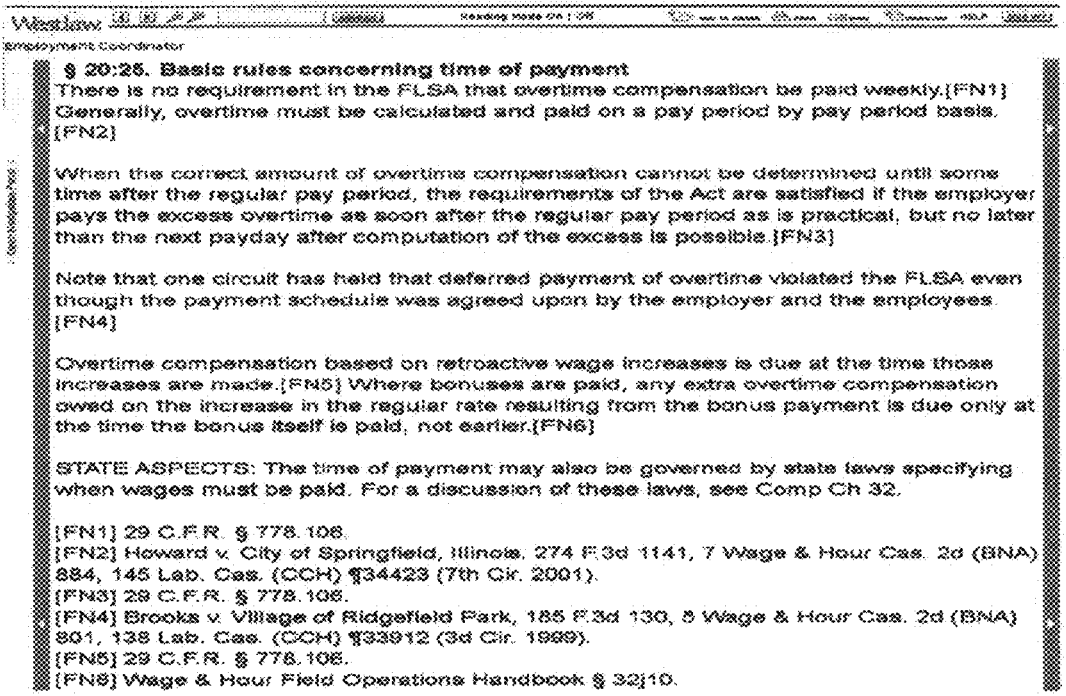
Figure 24:
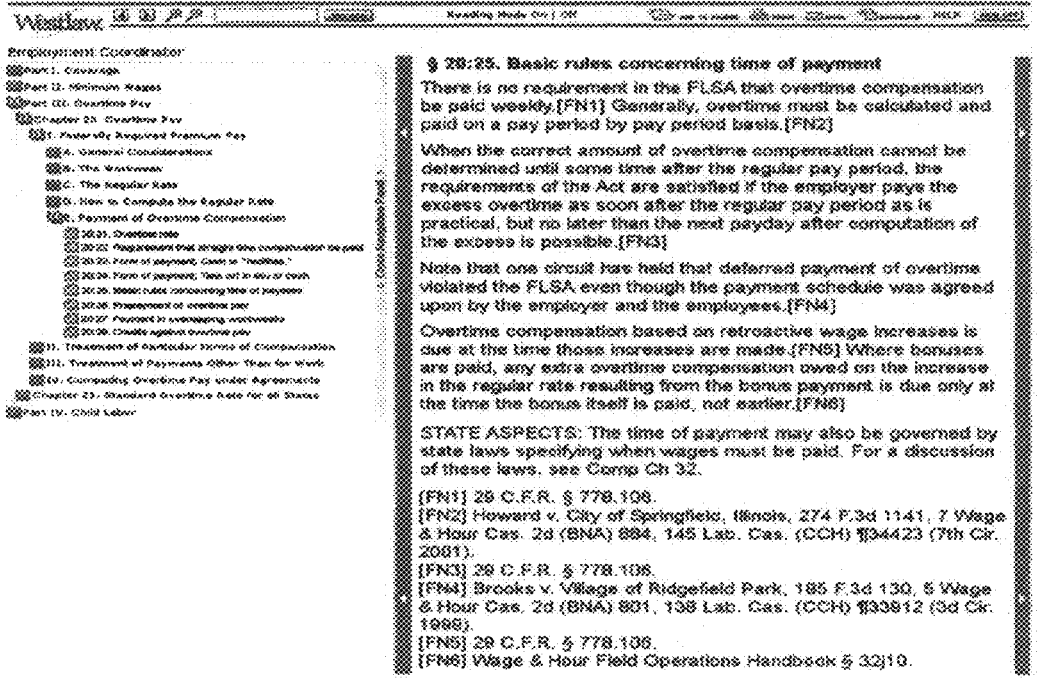

FIGS. 23-24 illustrate a reading mode interface where the user can view a selected document in reading mode display. This view shows a clean copy of the full text document, without editorial enhancements or hyperlinks. The screen is optimized for reading online with the feel and navigation of a book, and the font size and typeface are customizable user preferences. Left and right sidebars can be touched or clicked on to respectively to "turn" pages backwards or forwards.

Figure 25:
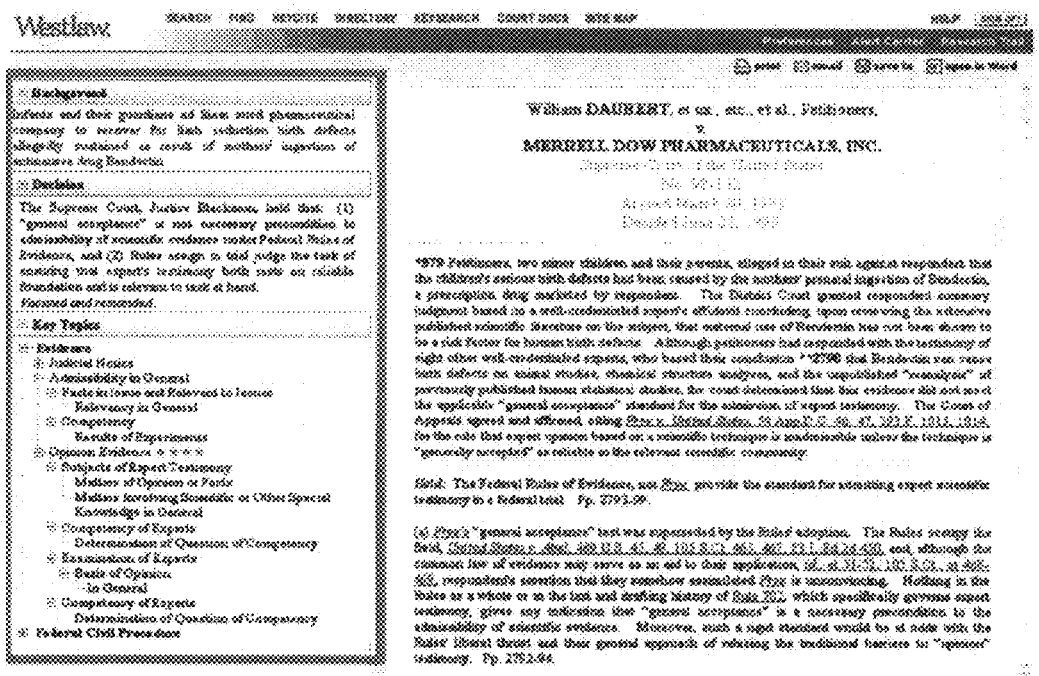

FIG. 25 shows an interface where information about the document is shown in a panel. The background and holding of a case are displayed in a panel on the left side of the screen instead of at the top of a case. In addition, the case topics fit in the Key Number System in a panel on the left side of the screen along with the information associated with the Headnotes.

Figure 26:
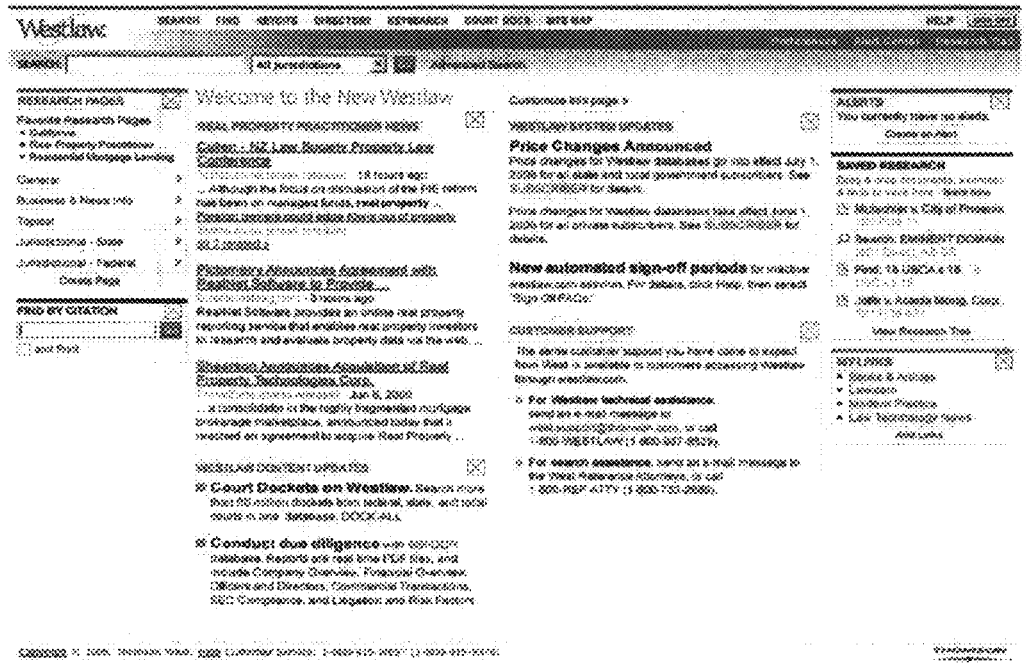

FIG. 26 shows an exemplary system homepage that has the ability to be customizable by the user. This homepage is a centralized location to start legal research after login. The customization is achieved using simple selection and drag-n-drop tools. A user can add databases from any jurisdiction or topic, clips and current awareness feeds or delete anything from the page by clicking a simple X in the corner of the item. In addition, modules are available that show what the user has recently researched.

Figure 27:
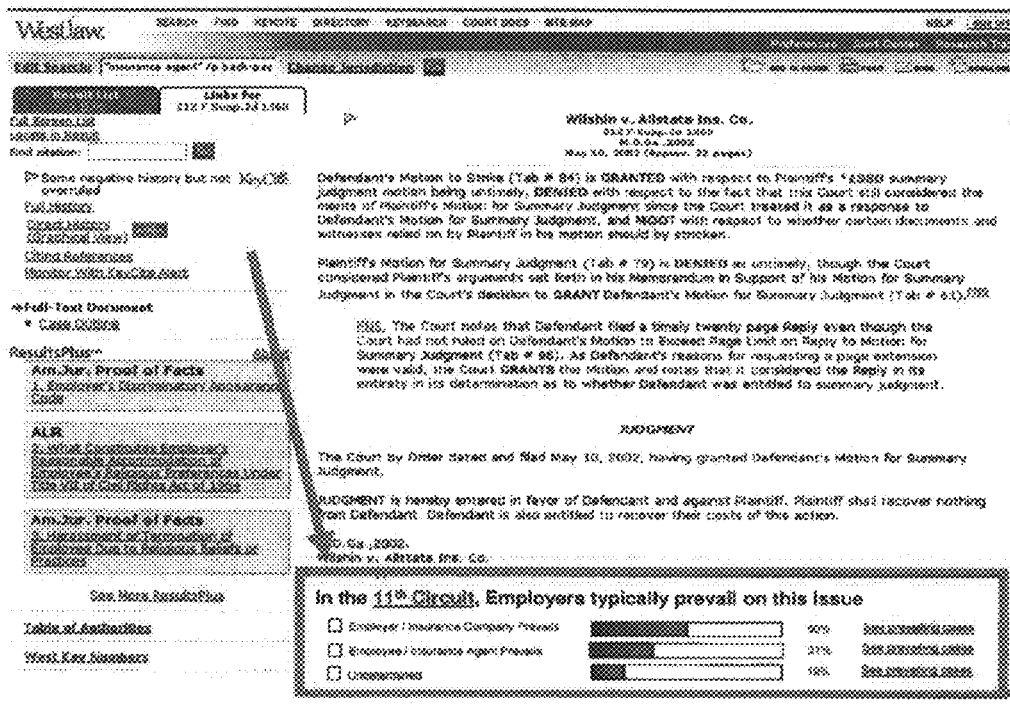

FIG. 27 illustrates an interface with statistics about the party type and the outcome. By identifying party types in cases and verdicts and settlements databases and showing which type is favored in certain types of actions, researchers obtain new information pertaining to the likelihood of prevailing in a certain type of matter. Information is shown by jurisdiction, court, and judge for the purposes of judge or forum selection.

Figure 28:
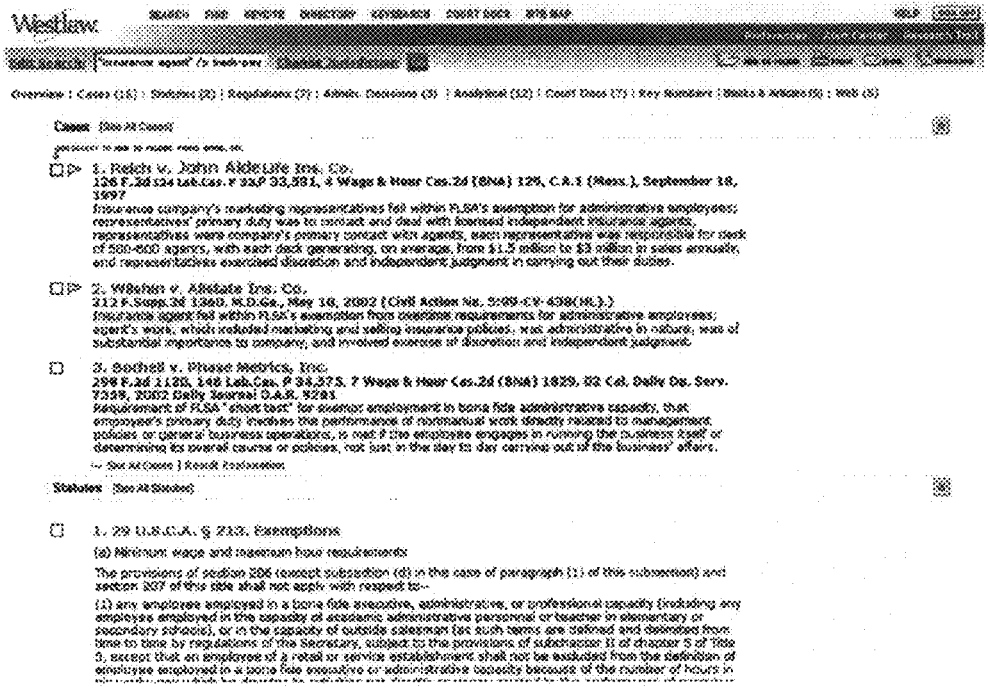

FIG. 28 shows an interface that utilizes an improved search algorithm. Key numbers, citation patterns, and what other customers found helpful assist the algorithm in determining highly relevant documents without needing to know what keywords to use.

Instead of running multiple searches or analyzing a trail of citations to find the most important documents regarding legal issue, the improved results provide the user with the most relevant documents at the start of the legal research. The interface shows an overview of search results showing the best documents in each category (cases, statutes, regulations (regs), etc.).

Figure 29:
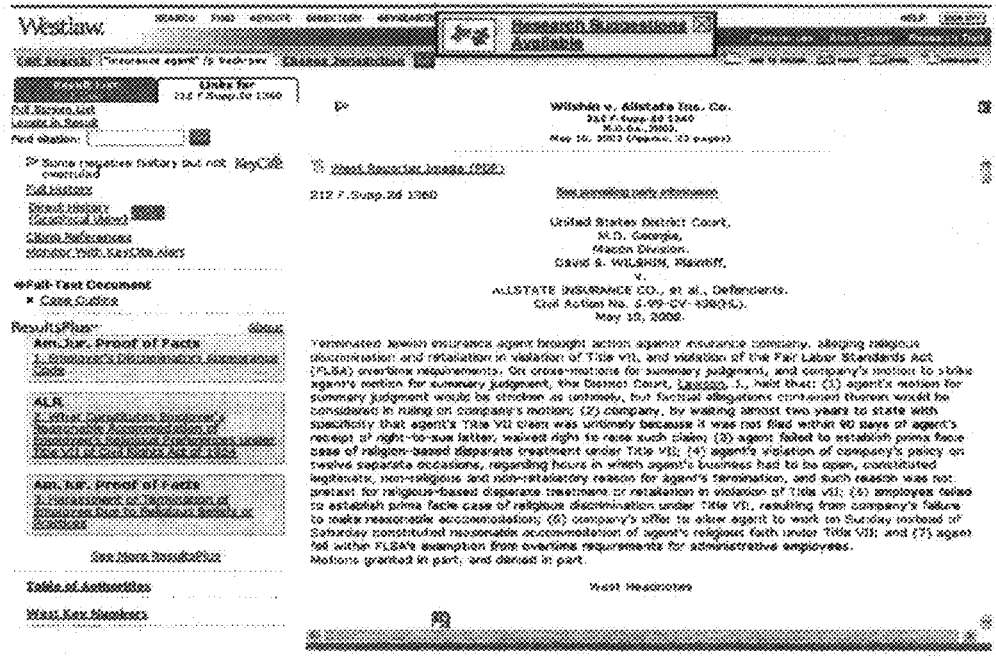
Figure 30:
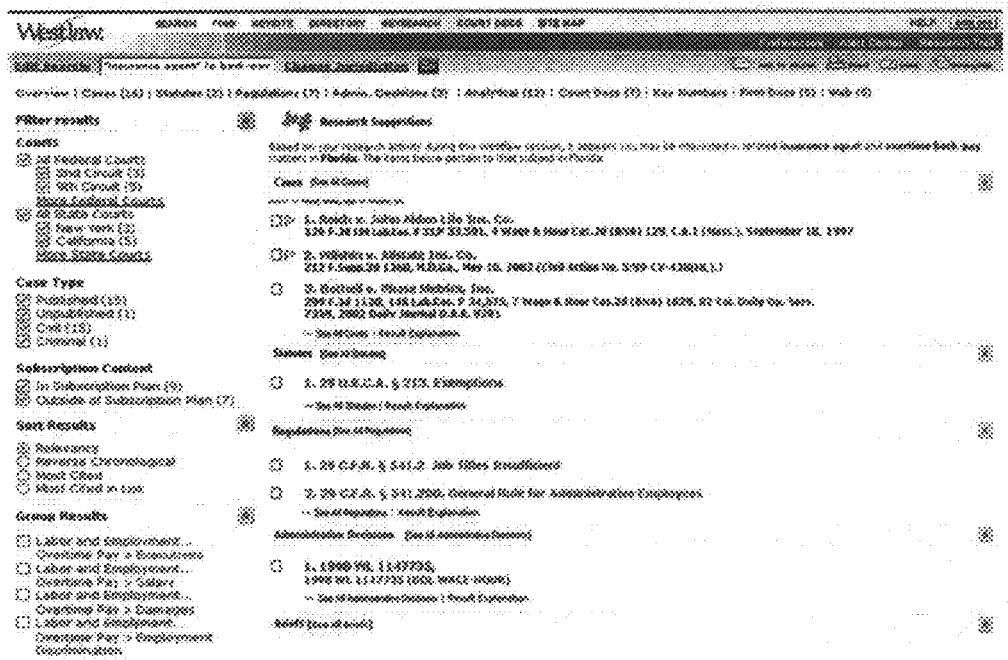

FIGS. 29-30 display interfaces in which the user is notified of other research that may be interest. The exemplary system records which documents the user has found to be of interest, based on activities such as viewing, printing, downloading, emailing, saving in their collections area, or annotating, and in response suggests relevant law based on this observed research activity.

Figure 31:
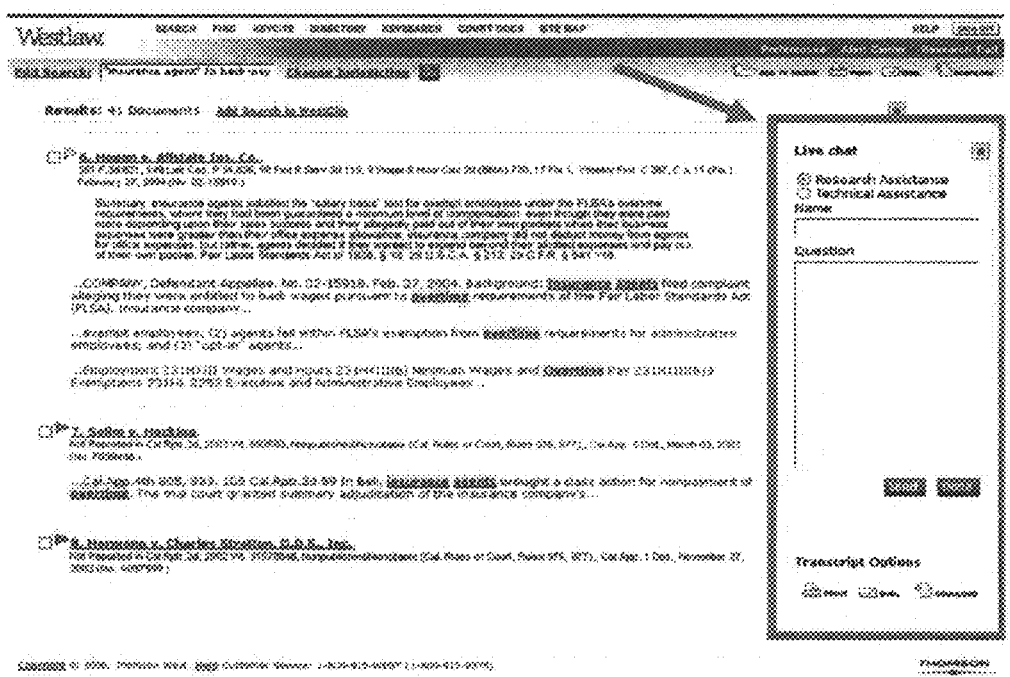

FIG. 31 shows an interface in which a pop-up window appears allowing the user to seek online help. Live chat service allows the user to multitask better—for instance, if an associate comes into the user's office or the user gets a phone call during the live chat session with a Westlaw representative, the user can easily accommodate that. The user receives an e-mail of the live help chat session, so the advice is easily accessible for the user in the future. In addition, billing is suspended during a live chat session but not necessarily during a telephone session. Some embodiments include a click-to-call function that enables the user to enter a telephone number and receive a call from a research or technical assistant. Some variants of this embodiment bill the user account for use of this service.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. An online legal research system comprising:
a plurality of databases containing legal documents;
a subscriber database having data structures associated with corresponding users of the system, each data structure being logically associated with user selected or defined content, and being associated with a user data file comprising one or more of predictive text data, user preferences, or user usage habits;
a server, comprising a processor and a memory, in electrical communication with the databases and configured:
to provide by the server one or more portions of a graphical user interface to one or more client access devices, the one or more portions including a user search interface comprising a set of pre-search filter input boxes designed to delimit databases from the plurality of databases and an expandable user text entry box for receiving text defining a query;
prior to running a search based on the query, to automatically identify and select by the server an appropriate at least one database based at least in part on inputs received via the user search interface and not on a set of query results, the appropriate database identified from a plurality of databases, wherein the appropriate at least one database from the plurality of databases is selected based on a predictive text analysis of a set of inputs received via the set of pre-search filter input boxes, the inputs comprising textual input entered by the user from the pre-search filter input boxes;
wherein the predictive text analysis is based in part on the one or more of predictive text data, user preferences, or user usage habits stored in the user data file and accessed by the server from the data structures in the subscriber database; and
to automatically search by the server an appropriate at least one of the databases from the plurality of databases in response to the query without the user identifying the at least one database.

2. The system of claim 1, wherein the expandable user text entry box has an associated character length threshold and wherein the box is expanded in response to a user text entry satisfying a predetermined condition based on the character length threshold.

3. The system of claim 1,
wherein the graphical user interface further includes:
a display region comprising a listing of a legal document stored within one of the databases; and
a set of user interface elements comprising a first user interface element which enables the user to identify and store the listed legal document or portion thereof in logical association with a corresponding one of the data structures.

4. The system of claim 3, wherein the interface further includes:
a second user interface element which enables the user to associate a user defined note with the listed legal document; and a third user interface element which enables the user to associate a privacy level with the user defined note.

5. The system of claim 1, wherein the one or more databases is from the group consisting of the following: a set of primary databases, a set of secondary databases, and a set of metadata databases.

6. A method for an online legal research system, the method comprising:
storing data structures associated with corresponding users in a subscriber database, each data structure being logically associated with user selected or defined content, and being associated with a user data file comprising one or more of predictive text data, user preferences, or user usage habits;
providing a graphical user interface including a user search interface having a set of pre-search filter input boxes designed to delimit databases from the plurality of databases and a text entry box for defining a query;
expanding the box in response to receiving text defining a query;
prior to running a search based on the query, automatically identifying and selecting an appropriate at least one database based at least in part on inputs received via the user search interface and not on a set of query results, the appropriate database identified from a plurality of databases, wherein the appropriate at least one database from the plurality of databases is selected based on a predictive text analysis of a set of inputs received via the set of pre-search filter input boxes, the inputs comprising textual input entered by the user from the pre-search filter input boxes;
wherein the predictive text analysis is based in part on the one or more of predictive text data, user preferences, or user usage habits stored in the user data file and accessed from the data structures in the subscriber database; and
automatically searching an appropriate at least one database from the plurality of databases of the legal research system in response to the query without the user identifying the at least one database.

7. The method of claim 6, wherein the expandable user text entry box has an associated character length threshold and wherein the box is expanded in response to a user text entry satisfying a predetermined condition based on the character length threshold.

8. The method of claim 6, wherein the one or more portions includes displaying a region for displaying a listing of a legal document stored within one of the databases, and further comprising enabling the user to identify and store the listed legal document or portion thereof in logical association with a corresponding one of a plurality of data structures logically associated with a subscriber database.

9. The method of claim 8, further comprising:
associating a user-defined note with the listed legal document; and
associating a privacy level with the user-defined note.

10. The method of claim 6, wherein the one or more databases is from the group consisting of the following: a set of primary databases, a set of secondary databases, and a set of metadata databases.

11. The method of claim 6, wherein the automatically searching includes identifying a first set of documents based on relevance to the query and identifying a second set of documents based on the first set of documents.

12. A non-transitory machine readable medium that stores instructions to be executed by a machine, the instructions when executed causing the machine to:
  store data structures associated with corresponding users in a subscriber database, each data structure being logically associated with user selected or defined content, and being associated with a user data file comprising one or more of predictive text data, user preferences, or user usage habits;
  provide one or more portions of a graphical user interface to one or more client access devices, the one or more portions including a user search interface comprising a set of pre-search filter input boxes designed to delimit databases from the plurality of databases and an expandable user text entry box for receiving text defining a query;
  prior to running a search based on the query, automatically identifying and selecting an appropriate at least one database based at least in part on inputs received via the user search interface and not on a set of query results, the appropriate database identified from a plurality of databases, wherein the appropriate at least one database from the plurality of databases is selected based on a predictive text analysis of a set of inputs received via the set of pre-search filter input boxes, the inputs comprising textual input entered by the user from the pre-search filter input boxes;
  wherein the predictive text analysis is based in part on the one or more of predictive text data, user preferences, or user usage habits stored in the user data file and accessed from the data structures in the subscriber database; and
  automatically search an appropriate at least one database from the plurality of databases containing legal documents in response to the query without the user identifying the at least one database.

13. The machine readable medium of claim 12, wherein the expandable user text entry box has an associated character length threshold and wherein the box is expanded in response to a user text entry satisfying a predetermined condition based on the character length threshold.

14. The machine readable medium of claim 12, wherein the one or more portions includes a display region comprising a listing of a legal document stored within one of the databases, and further comprising instructions causing the machine to enable the user to identify and store the listed legal document or portion thereof in logical association with a corresponding one of a plurality of data structures logically associated with a subscriber database.

15. The machine readable medium of claim 14, further comprising instructions causing the machine to:
  receive and associate a user-defined note with the listed legal document; and
  associate a privacy level with the user-defined note.

16. The machine readable medium of claim 12, wherein the one or more databases is from the group consisting of the following: a set of primary databases, a set of secondary databases, and a set of metadata databases.

* * * * *